(12) United States Patent
Leng

(10) Patent No.: US 11,540,631 B2
(45) Date of Patent: *Jan. 3, 2023

(54) COMPOSITE STRUCTURAL BOARD

(71) Applicant: NEW-TEC INTEGRATION (XIAMEN) CO., LTD, Fujian (CN)

(72) Inventor: Luhao Leng, Fujian (CN)

(73) Assignee: NEW-TEC INTEGRATION (XIAMEN) CO., LTD., Xiamen (CN)

( * ) Notice: Subject to any disclaimer, the term of this patent is extended or adjusted under 35 U.S.C. 154(b) by 269 days.

This patent is subject to a terminal disclaimer.

(21) Appl. No.: 16/946,471

(22) Filed: Jun. 23, 2020

(65) Prior Publication Data

US 2020/0323343 A1 Oct. 15, 2020

Related U.S. Application Data

(63) Continuation of application No. 16/643,483, filed as application No. PCT/CN2018/102464 on Aug. 27, 2018.

(30) Foreign Application Priority Data

Aug. 30, 2017 (CN) .......................... 201710766295.7
Apr. 3, 2018 (CN) .......................... 201820465365.5

(Continued)

(51) Int. Cl.
  *B65D 43/16* (2006.01)
  *A47B 96/20* (2006.01)
  (Continued)

(52) U.S. Cl.
  CPC .............. *A47B 96/206* (2013.01); *B32B 3/08* (2013.01); *B32B 3/28* (2013.01); *B32B 3/30* (2013.01);
  (Continued)

(58) Field of Classification Search
  CPC ................ B65D 11/18; B65D 11/1873; B65D 2543/00231; B65D 43/166; B65D 43/22;
  (Continued)

(56) References Cited

U.S. PATENT DOCUMENTS 1,485,954 A   3/1924  Brasch
3,374,915 A   3/1968  Verhein et al.
(Continued)

FOREIGN PATENT DOCUMENTS

CN   2517302 Y   10/2002
CN   2659227 Y   12/2004
(Continued)

OTHER PUBLICATIONS

Extended European Search Report for European Application No. 21177901.2; dated Mar. 18, 2022; 5 pages.

(Continued)

*Primary Examiner* — Shawn M Braden
(74) *Attorney, Agent, or Firm* — Perkins Coie LLP

(57) ABSTRACT

A box is made of structural boards having a face plate (2) including a main body portion (2c) that is substantially in one plane and a peripheral portion (2a) surrounding the main body. The boards further include a base plate (3) having integrally formed protrusions. The lower surface of the face plate (2) is attached to and supported on top of the protrusions. A stiffener (4) connects the peripheral portion (2a) of the face plate (2) and the base plate (3) together. At least a part of the stiffener (4) is fixedly connected to the base plate (3), and at least another part of the stiffener (4) is fixedly connected to at least a part of a lower surface of the peripheral portion (2a) of the face plate.

19 Claims, 34 Drawing Sheets

(30) Foreign Application Priority Data

| Apr. 3, 2018 | (CN) | 201820466837.9 |
|---|---|---|
| Apr. 3, 2018 | (CN) | 201820466880.5 |
| Apr. 3, 2018 | (CN) | 201820467034.5 |
| Apr. 3, 2018 | (CN) | 201820472588.4 |
| Apr. 3, 2018 | (CN) | 201820480545.0 |

(51) Int. Cl.
*B32B 3/08* (2006.01)
*B32B 3/28* (2006.01)
*B32B 3/30* (2006.01)
*B32B 7/12* (2006.01)
*B32B 27/08* (2006.01)
*B65D 43/22* (2006.01)
*B65D 65/40* (2006.01)

(52) U.S. Cl.
CPC ............. *B32B 7/12* (2013.01); *B32B 27/08* (2013.01); *B65D 43/166* (2013.01); *B65D 43/22* (2013.01); *B65D 65/403* (2013.01); *B32B 2479/00* (2013.01)

(58) Field of Classification Search
CPC .. B65D 65/403; B65D 43/165; A47B 96/206; A47B 96/20; A47B 2220/0052; B32B 3/08; B32B 3/28; B32B 3/30; B32B 7/12; B32B 27/08; B32B 2479/00; F16S 1/02; F16S 1/06
See application file for complete search history.

(56) References Cited

U.S. PATENT DOCUMENTS

| 4,696,412 | A | 9/1987 | McGowan et al. |
|---|---|---|---|
| 5,092,093 | A | 3/1992 | Lu |
| 5,152,591 | A | 10/1992 | Beals |
| 5,868,081 | A | 2/1999 | Raab |
| 5,947,037 | A | 9/1999 | Hornberger et al. |
| 6,058,853 | A | 5/2000 | Pinch |
| 6,343,454 | B1 | 2/2002 | Fisher |
| 8,499,954 | B2 | 8/2013 | Tang |
| 9,808,081 | B2 | 11/2017 | Leng |
| 10,932,560 | B2 | 3/2021 | Leng |
| 2003/0230042 | A1 | 12/2003 | Rhodebeck et al. |
| 2008/0157571 | A1 | 7/2008 | Richardson |
| 2008/0295454 | A1* | 12/2008 | Leng ............. E04C 2/365 53/80 |
| 2009/0324872 | A1 | 12/2009 | Leng |
| 2010/0043681 | A1 | 2/2010 | Leng |
| 2010/0108669 | A1 | 5/2010 | Yang |
| 2010/0310811 | A1 | 12/2010 | Leng |
| 2012/0117910 | A1* | 5/2012 | Chuang ............. A47B 96/20 52/588.1 |
| 2014/0197168 | A1 | 7/2014 | Miller et al. |
| 2014/0319131 | A1 | 10/2014 | Rees et al. |
| 2016/0272363 | A1 | 9/2016 | Matsuoka |
| 2017/0225864 | A1* | 8/2017 | Kinskey ............. B65D 25/06 |
| 2019/0021484 | A1* | 1/2019 | Leng ............. A47B 96/205 |
| 2019/0193340 | A1 | 6/2019 | Leng |
| 2020/0385167 | A1 | 12/2020 | Ahmed |

FOREIGN PATENT DOCUMENTS

| CN | 1579889 | A | 2/2005 |
|---|---|---|---|
| CN | 201099397 | Y | 8/2008 |
| CN | 101520125 | A | 9/2009 |
| CN | 201761705 | U | 3/2011 |
| CN | 102937726 | A | 3/2013 |
| CN | 102987226 | A | 3/2013 |
| CN | 103213729 | A | 7/2013 |
| CN | 103263146 | A | 8/2013 |
| CN | 103284471 | A | 9/2013 |
| CN | 103625725 | A | 3/2014 |
| CN | 204021406 | U | 12/2014 |
| CN | 204280164 | U | 4/2015 |
| CN | 106617681 | A | 5/2017 |
| FR | 429197 | A | 9/1911 |
| FR | 2918358 | B3 | 7/2009 |
| FR | 2993540 | A1 | 1/2014 |
| GB | 2045339 | A | 10/2018 |
| JP | 2011514259 | A | 5/2011 |
| JP | 2013014378 | A | 1/2013 |
| WO | 2016004342 | A1 | 1/2016 |
| WO | 2017045579 | A1 | 3/2017 |

OTHER PUBLICATIONS

Supplementary European Search Report for European Application No. 197823776.8; dated Jan. 19, 2022; 10 pages.
Extended European Search Report for Application No. 16845693.7 dated Feb. 21, 2019, 6 pages.
Extended European Search Report dated Apr. 9, 2021 for Application No. 18851767.6, 7 pages.
Extended European Search Report for European Application No. 19782376.8; dated Aug. 24, 2022; 10 pages.
Notice of Reasons for Refusal for Japanese Appl. No 2020-533335 with English translation; dated Aug. 24, 2022; 6 pages.

* cited by examiner

COMPOSITE STRUCTURAL BOARD

CROSS-REFERENCE TO RELATED APPLICATIONS

This application is a Continuation of U.S. patent application Ser. No. 16/643,483 filed Feb. 28, 2020, which is a 35 U.S.C. section 371 national phase of International Application No. PCT/CN2018/102464 filed Aug. 27, 2018, which claims priority to Chinese patent application Nos.: 201710766295.7 filed Aug. 30, 2017; 201820472588.4 filed Apr. 3, 2018; 201820480545.0 filed Apr. 3, 2018; 201820466880.5 filed Apr. 3, 2018; 201820465365.5 filed Apr. 3, 2018; 201820467034.5 filed Apr. 3, 2018 and 201820466837.9 filed Apr. 3, 2018. These applications are incorporated herein by reference.

FIELD

The present disclosure generally relates to a composite structural board comprised of a stiffener and a plastic board for manufacturing furniture.

BACKGROUND

As common materials in the furniture manufacturing, solid wood boards and curved planks may be used to manufacture tables, seat plates and backrests of chairs, horizontal and vertical partitions of book shelves or cabinets, drawer plates, and the like. However, these materials consume large quantities of wood and is limited by use occasions and service life.

Nowadays, for the objectives of protecting the environment, reducing production costs and the like, more and more plastic boards are used to substitute for wooden boards in furniture products. A plastic board may be formed by injection molding or blow molding. The injection-molded plastic board typically has a limited strength. Although the blow molded plastic has a terse appearance and can be easily cleaned, it is of a large thickness. In particular, for a large-scale furniture product, the blow-molded plastic board needs a long production cycle and thus results in low furniture manufacturing efficiency. Moreover, to manufacture a large blow-molded plastic board, there arises a need for a large mould and a blow molding machine for performing a complicated manufacturing process, incurring high production costs. Metal boards may also be used for manufacturing furniture. However, as the machined metal board is dull in color and texture, it has limited applications.

In the Chinese invention patent CN1029877226B owned by the inventor of the present application, a table board having a three-layer structure is revealed, comprising sequentially a face plate, a reinforcement plate and a reinforcement frame located therebetween, where the reinforcement frame is formed by bending a tube with a square cross-section and supported within an annular hollow cavity formed by the periphery of the face plate and the reinforcement plate while cooperating with the face plate, the reinforcement plate, and an overlapping part of an upper and a lower flange formed on the face plate and the reinforcement plate, so as to achieve position limiting. Manufacturing such composite board involves bending the periphery of the face plate and the reinforcement plate to form an annular hollow cavity therebetween, and then inserting the reinforcement frame into the hollow cavity. In the process, three different components need to cooperate with one another, resulting in a complicated processing process and high costs. Furthermore, the combination of the three components needs to be further improved in respect of strength.

Hence, there is a need for a composite structural board having higher strength and longer service life while processed simply with low costs.

SUMMARY

The present disclosure provides a composite structural board, comprising: a face plate comprising a main body portion that is substantially flat and a peripheral portion surround the main body portion formed by the main body portion extending downwards, the face plate having an upper surface and a lower surface; a base plate provided with a plurality of protrusions which are substantially uniformly distributed and integrally formed, the lower surface of the face plate being attached to and supported on top faces of the protrusions; and a stiffener for fixedly connecting the peripheral portion of the face plate and the base plate together, wherein a cross-section of the stiffener is of a closed frame shape, at least a part of the closed frame shape is fixedly connected to a bottom surface of the base plate, and at least a part of a vertical surface of the stiffener located outside is fixedly connected to at least a part of a lower surface of the peripheral portion of the face plate. Such structure can bring the superiority of the plastic board and the stiffener into full play, which can enhance significantly the strength of the plastic board, simplify the manufacturing process and thus reduce the productions costs greatly.

The composite structural plate for use in furniture includes a one-piece plastic board and a stiffener formed by processing at least one metal sheet, and the plastic face plate, base plate and stiffener can be adhered to one another via an adhesive or in other manners after being formed. The stiffener can reliably support the plastic face plate and the peripheral portion of the plastic base plate, thereby providing higher strength to the composite structural board.

Preferably, the peripheral portion of the face plate extends downwards along a direction substantially perpendicular to the main body portion to form an extension portion, the stiffener is a hollow structure with a rectangular cross-section, a top surface of the stiffener is substantially parallel to the main body portion of the face plate and abuts against a lower surface of the base plate to be fixed closely with the lower surface of the base plate, and a lower end of the vertical surface protrudes slightly outwards along a horizontal direction to form a flange onto which a free end of the extension portion of the face plate is supported.

Preferably, an outer periphery of the base plate is a flat portion without protrusions, the flat portion is recessed in a direction towards the face plate to form a recess portion with a flat bottom surface, the recess portion having a width greater than that of the stiffener, and a top surface of the stiffener is fixedly connected with the bottom surface of the recess portion of the base plate.

Preferably, an outer periphery of the base plate is a flat portion without protrusions, a top surface of the flat portion and the top surfaces of protrusions are in a same plane, and the portion is clamped between the top surface of the stiffener and the lower surface of the face plate.

Preferably, the cross-section of the stiffener presents a hollow frame structure of an upright L shape, a section of the L shape being located at an innermost side relative to the peripheral portion of the face plate and perpendicular to the face plate, a lowermost end of a stepped surface located outside the L-shaped, hollow frame structure protruding slightly outwards along a horizontal direction to form an integral flange; the peripheral portion of the face plate extends downwards along a direction substantially perpendicular to the main body portion to form a stepped extension portion, the step portion matching the stepped surface of the L-shaped frame structure in shape, a free end of the extension portion being supported on the flange such that an end of the flange is substantially flush with an outer surface of the extension portion; and an outer periphery of the base plate is a flat portion without protrusions, the flat portion being clamped between a top surface of the stiffener and the lower surface of the face plate.

Preferably, the lower surface of the face plate is adhered to and supported on the top surfaces of the protrusions by thermal welding.

Preferably, the section of the stiffener is a frame structure of a substantially double-L shape, the double-L shape having a common vertical side which extends along a direction substantially perpendicular to the main body portion until abutting against the lower surface of the face plate, and the vertical side is located at an inner side of the peripheral portion and extends along and against an inner surface of the peripheral portion, a bottom side of a L-shaped structure located outside the double-L shape and extending laterally outwards being bent upwards around a lowermost end of an extension portion of the peripheral portion to wrap a bottom edge of the peripheral portion.

Preferably, an end of the vertical side of the double-L shape is bent horizontally inwards along a direction substantially parallel to the main body portion to press against an edge of the base plate.

Preferably, a wrapped region of the peripheral portion of the face plate occupies a fifth, a quarter, or a third of the peripheral portion of the face plate in a direction substantially perpendicular to the main body portion.

Preferably, the bottom side wraps the whole edge of the peripheral portion along a circumferential direction of the face plate, or wraps at intervals the edge of the peripheral portion of the face plate.

Preferably, the face plate is a vacuum-formed or injection-molded plastic plate while the base plate with uniformly distributed protrusions is a vacuum-formed plastic plate formed integrally.

Preferably, it further comprises an adhesive for attaching the face plate to the base plate.

Preferably, the stiffener is formed of metal or rigid plastic.

Preferably, the stiffener formed of metal is obtained by bending or rolling a metal sheet.

Preferably, the stiffener is formed of steel.

Preferably, a top surface of the face plate bears a texture of natural wood or stone.

Preferably, the face plate is formed thereon with a recessed hand-clasping feature.

Preferably, the hand-clasping feature is configured to conform to ergonomics.

Preferably, the stiffener is formed by stretching and then crimping or bending.

Preferably, the composite structural board is of a rectangular shape.

Preferably, a flange of the stiffener at its lower side is provided with a wing extending downwards therefrom.

The present disclosure further provides a box, comprising a box body consisting of a front side panel, a rear side panel, a left side panel, a right side panel and a floor panel, wherein at least one of the side panels is formed of the composite structural board according to the above embodiments.

Preferably, the box comprises:

support platforms respectively formed by bottom stiffeners of the front side panel, the rear side panel, the left side panel and the right side panel;

positioning edges respectively formed by a peripheral portion of the floor panel extending horizontally outwards and respectively located on the support platforms of the respective side panels; and floor panel fixing members configured to pass through fixing holes formed in the positioning edges and corresponding mounting holes formed in the support platforms, to fix the positioning edges onto the support platforms.

Preferably, adjacent side panels are provided with a limit post and a limit hole, respectively, wherein the limit post is configured to snap into the limit hole, so that the adjacent side panels are able to connect with each other a detachably.

Preferably, the left side panel and the right side panel are located between the front side panel and the rear side panel, and a respective sides of the left side panel and the right side panel are provided with limit posts, and inner sides of the front side panel and the rear side panel are provided with limit holes flared from top to bottom at respective positions.

Preferably, a middle portion of the floor panel is recessed downwards relative to the positioning edges.

Preferably, the middle portion of the floor panel is formed with a plurality of recessed portions arranged regularly.

Preferably, the floor panel fixing members are formed of plastic.

Preferably, the box further comprises a box lid openable from a top of the box body, wherein a rear portion of the box lid is pivotably connected to the rear side panel of the box body, and the box lid is formed from the composite structural board according to the above embodiments.

Preferably, the box lid is pivotably connected to the rear side panel via a detachable hinge assembly, the hinge assembly comprising:

a first hinge member fixed to a bottom of a rear stiffener of the box lid;

a second hinge member fixed into a recess that is formed at a rear side of a top stiffener of the rear side panel of the box body; and a pivot member pivotably connected the first hinge member to the second hinge member.

Preferably, the first hinge member and the second hinge member are of the same shape, and both comprise a fixing portion engaged with and fixed to the box lid or the box body, and one or more pivot portions extending perpendicularly to the fixing portion, wherein the pivot portions are provided therein with through holes extending in parallel with the fixing portion for pivotably receiving a pivot.

Preferably, when there are multiple pivot portions, the pivot portions are spaced apart along the fixing portion and the space between the pivot portions is set to receive a respective pivot portion, and the through holes in the pivot portions are coaxial to one another.

Preferably, the pivot is provided at a proximal end with a flange having a size greater than the size of the through hole of the pivot portion, and the pivot at its distal end is provided with one or more cutouts extending from distal to proximal such that the distal end of the pivot forms a plurality of resilient arms extending from proximal to distal and being capable of bending radially inwards, wherein a radial outer surface of each resilient arm is provided thereon with a protruding portion which is configured to pass through the through hole of the pivot portion when the resilient arm is at a bent state, and not to pass the through hole of the pivot portion when the resilient arm is at a stretched state.

Preferably, each of the cutouts is tapered from distal to proximal and finally forms a smooth transition.

Preferably, the protrusion portion has a distal guiding bevel and a proximal guiding bevel.

Preferably, the hinge assembly is formed of plastic.

Preferably, the box lid and the box body are provided with a locking assembly, the locking assembly comprising:

a first locking member fixed to a front portion of the box lid;

a second locking member fixed to the front side panel of the box body; and a third locking member configured to be pivotably mounted to the first locking member.

Preferably, the first locking member is plugged into a bottom of a front stiffener of the box lid via snap-fit means at its top to form an inverted U shape as a whole, and a top stiffener of the front side panel of the box body is configured to be at least partially received in a recess of the inverted U shape when the box lid is closed.

Preferably, the first locking member is provided at its front portion with a horizontal connecting rod, and the third locking member is provided at its top with a hook which is configured to hook onto the horizontal connecting rod and pivot around the same in a certain range.

Preferably, the second locking member is plugged into the front side of the top stiffener of the front side panel of the box body via snap-fit means at its rear side, a top portion of the second locking member is bent rearwards to form a horizontal bent portion located at a step portion formed at the top of the front side panel of the box body, and the second locking member and the third locking member are configured to be latched or locked together when the box lid is closed.

Preferably, the locking assembly is formed of plastic.

Preferably, the box is provided with a foldable limit member for limiting an open angle of the box lid relative to the box body, and wherein the foldable limit member is an elongated rod-like member that includes a first end pivotably fixed at a position on an inner side of a side stiffener of the box lid at a distance from the pivot portion of the box lid, a second end opposite the first end pivotably fixed at a position on an inner side of a top stiffener of the respective side panel of the box body at a distance from the pivot portion of the box lid, and a bendable resilient body portion extending between the first end and the second end.

Preferably, a length of the foldable limit member is sized such that a maximum open angle of the box lid relative to the box body is greater than 90° and less than 180°.

Preferably, the body portion is of a flat strip shape suitable for bending, and the first end and the second end are flat end portions perpendicular to the body portion.

Preferably, the first end and the second end each comprises a lateral protruding portion, and receiving holes for receiving the protruding portions are disposed at corresponding positions of the stiffeners of the left side panel and/or the right side panel of the box body.

Preferably, the foldable limit member is a one-piece plastic member.

Preferably, the box is provided with a self-positioning assembly configured to arbitrarily remain an open angle of the box lid relative to the box body, the self-positioning assembly comprising:

a holder fixed onto the top stiffeners of the left side panel and/or the right side panel of the box body, wherein the holder provided therein with a chute extending along the vertical direction through a top and a bottom surface of the holder, and a retaining hole extending along the horizontal direction to communicate with the chute and pass through a side surface of the holder facing the inside of the box body;

a support rod having a first end hinged to a respective side stiffener of the box lid and a second end extending through the chute, wherein the support rod is configured to slide and swing in the chute; and a fastening assembly disposed in the retaining hole for applying a pressure to the support rod, wherein the fastening assembly is configured to adjust the magnitude of the pressure.

Preferably, an inner surface of the retaining hole is provided with an internal thread, the fastening assembly comprising:

a compression block disposed in the retaining hole and being movable along the retaining hole disposed in the same;

a bolt having an external thread which is configured to match with the internal thread of the retaining hole; and a resilient piece disposed in the retaining hole between the compression block and the bolt, which is configured to apply a resilient force to the compression block.

Preferably, the resilient piece is a compression spring, the compression block is provided thereon with a boss, and the compression spring is nested at one end onto the boss and abuts at the other end against an end of the bolt.

Preferably, the second end of the support rod is provided with a stopper for preventing the support rod from sliding out of the chute.

Preferably, the self-positioning assembly further comprises a hinge base connected to the side stiffener of the box lid, and the first end of the support rod is hinged to the hinge base.

Preferably, the hinge base is provided with positioning pins, and the side stiffener of the box lid is provided thereon with a plurality of positioning holes distributed along its longitudinal direction for receiving the positioning pins.

Preferably, the top stiffeners of the left side panel and/or the right side panel of the box body are provided with locking grooves into which the holder can be mounted.

Preferably, the self-positioning assembly is located within a receiving space formed by the box body and the box lid when the lid is closed.

Preferably, the support rod, the holder and the hinge base are all formed of plastic.

Since the composite structural board according to the present disclosure at its periphery has a closed frame-like stiffener, the composite structural board has a greatly enhanced bearing capacity and a simple stiffener structure, thereby simplifying the manufacturing process, allowing convenient assembling, and reducing the production costs significantly. In addition, the composite structural board according to the present disclosure has no obviously protruding flange, to thus avoid causing hurt to people or damage to clothing in the surrounding.

DETAILED DESCRIPTION

The description about directions in any embodiment, for example, "upper/lower," "left/right," "top/bottom," and the like, is provided merely based on the drawings for illustration, without suggesting any limitation to the present disclosure.

Figure 1:
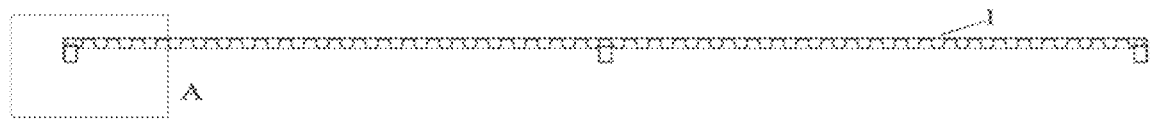
FIG. 1 illustrates a first embodiment of a double-layer composite structural board according to the present disclosure.
Figure 2:
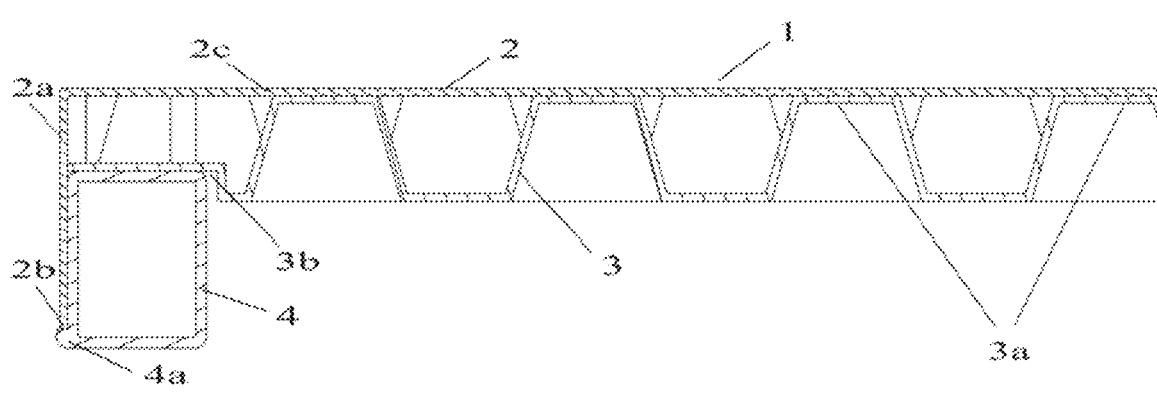
FIG. 2 is an enlarged view of the part A of the double-layer composite structural board as shown in FIG. 1.

In a first embodiment according to the present disclosure as shown in FIGS. 1 and 2, the composite structural board 1 is mainly comprised of three components: a face plate 2 facing outwards in normal use, a base plate 3 fixed to the face plate via an adhesive or any other feasible manner, and a stiffener 4 disposed at the peripheral portion of the face plate 2 and the base plate 3.

The face plate 2 has a main body portion 2c that is substantially in the same plane and a peripheral portion 2a surround the main body portion formed by the main body portion bent downwards, and the face plate 2 includes an upper surface facing outwards in normal use and a lower surface facing inwards in normal use. The base plate 3 is provided thereon with a plurality of protrusions or protrusion arrays 3a formed integrally and distributed substantially uniformly, where the lower surface of the face plate 2 is adhered to and supported on top surfaces of the plurality of protrusions 3a by thermal welding, and a circumferential edge of the base plate 3 abuts against the inner surface of the peripheral portion 2a of the face plate along the horizontal direction. Preferably, the adhesive is coated over the top surfaces of the protrusions 3a, forming dotted adhesion to the lower surface of the face plate 2.

The face plate 2 may be a vacuum-formed plastic board, or may be formed by an injection process. The base plate 3 may be formed using the same process as the face plate does, and in some embodiments, it may be formed integrally using a blister process. Although truncated conical protrusions or protrusion arrays 3a formed uniformly and alternately on the base plate 3 are shown in the figure, the protrusions 3a may be of various shape, depth or arrangement, according to actual needs.

The stiffener 4 is preferably formed of metal, more preferably steel, and it may also be formed of rigid plastic, as long as it can accomplish the objective of providing enhanced strength to the composite structural board.

Although the composite structural board is comprised of three components, as aforementioned, the composite structural board claimed in the present disclosure that can obviously increase the strength and reduce the number of components is called "double-layer composite structural board," because the stiffener 4 between the face plate 2 and the base plate 4 only located at the periphery of the composite structural board.

FIG. 2 is an enlarged view of the portion A in FIG. 1, which shows a specific structure of the stiffener 4 and the connection between the face plate 2 and the base plate 3. The stiffener 4 in the embodiment is a frame structure with a rectangular or square cross-section, which may be hollow, i.e., the cross section of the stiffener 4 is a closed frame. The peripheral portion 2a of the face plate 2 is bent downwards and then continues to extend downwards. An outermost vertical side of the stiffener 4 is fit with the downward peripheral portion 2a, and the bottom of the outermost vertical side protrudes slightly outwards along the horizontal direction to form an integral flange 4a onto which a free end 2b of the downward extension portion of the face plate is supported, such that an end of the flange 4a is substantially flush with an outer surface of the extension portion.

More specifically, the peripheral portion 2a formed by the main body portion 2c of the face plate 2 extending downwards along a direction substantially perpendicular to the main body portion 2c of the face plate 2 to form an extension portion. The top surface of the stiffener 4 is substantially parallel to the main body portion 2c of the face plate 2 and abuts against the lower surface of the base plate 3. The outermost vertical surface of the stiffener 4 abuts against an inner surface of a vertical extension portion of the peripheral portion 2a. The lower end of the vertical surface protrudes outwards to form a flange 4a, and the free end 2b of the extension portion of the face plate 2 is supported on the flange 4.

Although the stiffener 4 as shown in FIG. 2 has a rectangular or square section, it is only for clearly illustrating the position and configuration of the stiffener 4. In real products, a ratio of length to width of the stiffener 4 may be greater or less as required by the actual design. Moreover, the section of the stiffener 4 as shown in FIG. 2 is of a closed frame structure. However, in other embodiments, the stiffener 4 may be open at a certain edge, which is presented in a structure of, for example, a back-to-back "double-L shape."

The top of the stiffener 4 in FIG. 2 may be adhered fixedly to the base plate 3, for example, via an adhesive or the like, as discussed above, or may be clamped together with the bottom surface of the base plate 3 by machining. In order to enable the leftmost side of the stiffener 4 to more firmly fit with the inner surface of the downwardly extending peripheral portion 2a of the face plate 2 and keep it in place, the left side of the stiffener 4 and the inner surface of the face plate 2 may be coated with an adhesive or the like, and connected fixedly by thermal welding after being positioned.

FIG. 2 also illustrates that the outermost side of the base plate 3 is a flat portion without protrusions, and the flat portion is recessed slightly upwards in a direction towards the face plate 2, to form a recess portion 3b where a bottom surface is flat and a width is greater than the width of the stiffener 4, such that the top of the stiffener 4 can be placed within the recess portion 3b to connect fixedly the top surface of the stiffener 4 and a lower surface of the recess portion 3b of the base plate 3. The fixed connection here may be achieved by adhesive coating and then thermal welding.

FIG. 2 explicitly shows that a flange 4a is formed at a lower left part of the stiffener 4, by means of which the stiffener 4 can be positioned and supported reliably relative to the face plate 2.

Specifically, the stiffener 4 has a bottom end, i.e., the lowermost surface as can be seen in FIG. 2, which is opposite to the top end of the stiffener 4 connected with the face plate 2. After finishing the assembling of the face plate 2, the base plate 3 and the stiffener 4, the lowermost surface of the stiffener 4 forms the bottom end of the double-layer composite structural board, which may be, for example, an integral, continuous reinforced frame, such as a metal frame or a rigid plastic frame. It would be envisioned that the frame may be a discontinuous or segmented reinforced frame, such as a metal frame or plastic frame.

The width of the reinforced frame is far greater than the width of the lower edge of the face plate 2, thereby reinforcing the strength of the composite structural board while supporting the composite structural board. In addition, the thickness of the stiffener 4 may be 0.2, 0.4 or 1.0 times the thickness of the plastic face plate 2.

Figure 3:
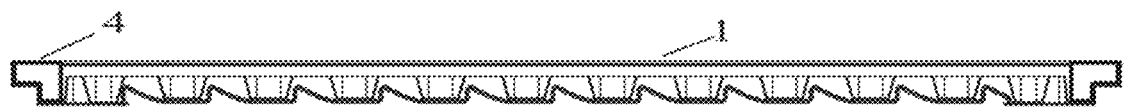
FIG. 3 illustrates a second embodiment of a double-layer composite structural board according to the present disclosure.

FIG. 3 illustrates a second embodiment of the present disclosure. Like in the first embodiment, the composite structural board according to the embodiment is comprised of three components, i.e., a face plate 2 facing outwards in normal use, a base plate 3 adhering fixedly to the face plate 2 via an adhesive or in any other feasible manner, and stiffeners 4 at least partly disposed between the face plate 2 and the base plate 3.

In the second embodiment as shown in FIG. 3, the face plate 2 at left and right ends is provided with a stiffener 4 with a section having an inverted L-shaped, hollow frame structure, respectively. The left stiffener 4 and the right stiffener 4 are arranged symmetrically, and a side of each of the two stiffeners is parallel with the top plate 2 and abuts against the lower surface of the top plate 2. The position where the two abut against each other may be coated with an adhesive and then subjected to thermal welding, so as to further ensure firm bonding therebetween.

Figure 4:
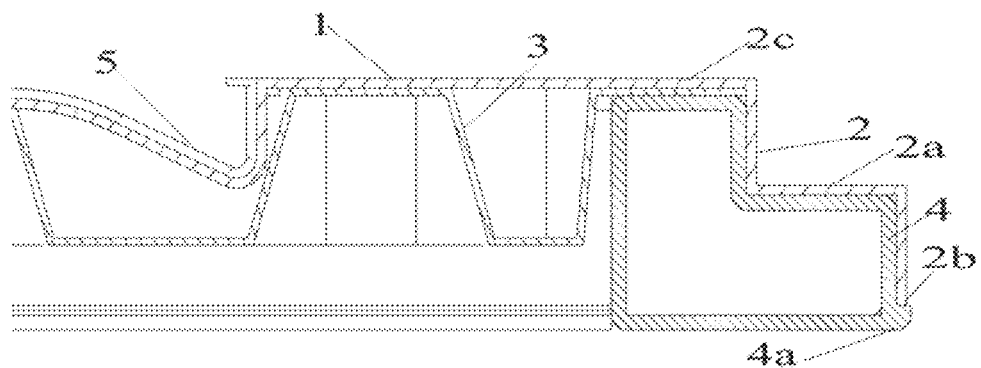
FIG. 4 is a partially enlarged view of a third embodiment of a double-layer composite structural board according to the present disclosure.

FIG. 4 illustrates a third embodiment of the present disclosure, where respective components of the double-layer composite structural board are all the same as or similar to those as described in the first and second embodiments in structure, relative position, connection, and the like. The differences between them are mainly embodied in the following two aspects.

First of all, a recess portion or a hand-clasping feature 5 is formed on the face plate 2 or in an outward surface thereof, which is located at the outermost surface of the furniture assembled from the composite structural boards, for example, on a door of a cabinet, for users' convenience when opening and closing the door, or for ease of clasping the composite structural board itself. Preferably, the hand-clasping feature 5 has a shape conforming to ergonomics to facilitate the user's operation, thereby improving the user experience.

Secondly, the stiffener 4 is presented in an "L" shape as shown in FIG. 3. A proportion of a vertical portion to a horizontal portion in the L shape may be adjusted according to the actual needs, and for example, the vertical portion may be longer or shorter than the horizontal portion. In the embodiment, the cross-section of the stiffener 4 is an L-shaped frame structure, and the bottom of the outermost vertical side of the L shape protrudes outwards to form a flange 4a on which a free end 2b of the peripheral portion 2a of the face plate 2 extending downwardly is stably supported.

More specifically, the cross section of the stiffener 4 is a hollow frame structure 4 of an upright L shape. A vertical side of the L-shaped, hollow frame structure is located adjacent to the innermost side of the protrusions 3a on the base plate 3, a lowermost end of a stepped surface located outside the L-shaped, hollow frame structure protrudes outwards to form a flange 4a, the peripheral portion 2a of the face plate 2 is bent continuously downwards along a direction substantially perpendicular to the main body portion 2c to form a stepped extension portion, and the stepped portion matches the stepped surface of the L-shaped frame structure in shape. A free end 2b of the stepped extension portion of the face plate 2 is stably supported on the flange 4a.

In the third embodiment as shown in FIG. 4, the face plate 2 at its edge (i.e., the peripheral portion 2a) has a different shape than the counterpart in the first and second embodiments. As can be seen clearly from FIG. 4, the peripheral portion 2a of the face plate matches the stiffener 4 in shape, i.e., the peripheral portion 2a is fit with the L-shaped structure of the stiffener 4 and thus presented in an L-shaped structure as well. Due to the shape fitting, the face plate 2 is changeable in shape and more pleasant in appearance, and a firm connection between the face plate 2 and the stiffener 4 can also be achieved, thereby enhancing the overall strength of the composite structural board. Of course, the face plate 2 may be configured similarly to that in the first and second embodiments, i.e., it may be bent only once.

Figure 5:
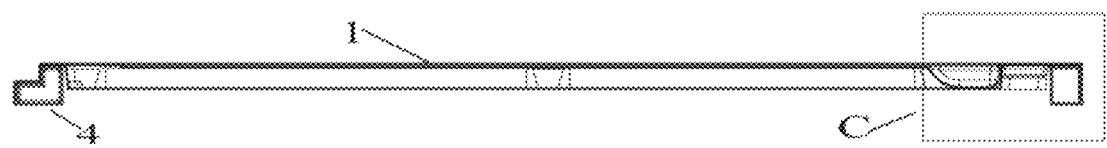
FIG. 5 illustrates a fourth embodiment of a double-layer composite structural board according to the present disclosure.
Figure 6:
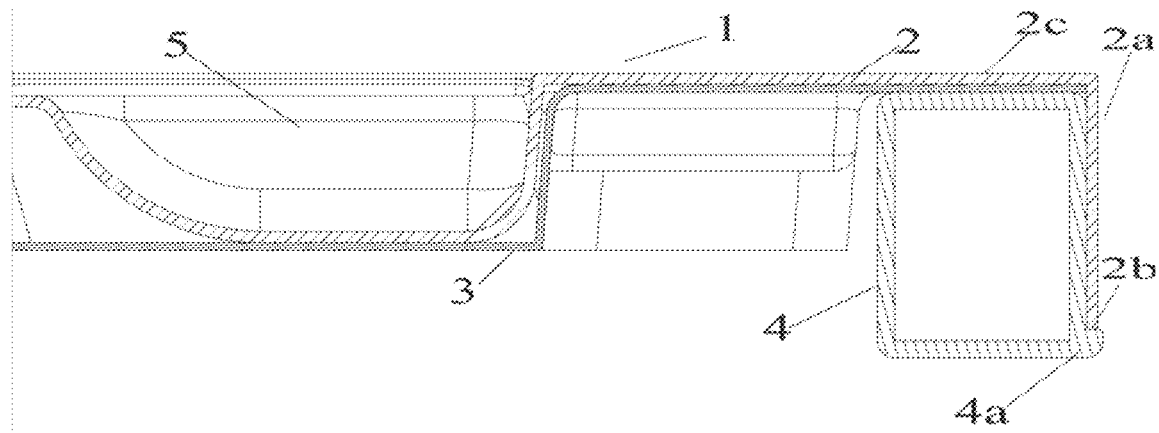
FIG. 6 is an enlarged view of the part C of the double-layer composite structural board as shown in FIG. 5.

FIGS. 5 and 6 illustrate a fourth embodiment of the present disclosure. Like in the first, second and third embodiments, as state above, the composite structural board according to the fourth embodiment may be comprised of three components, including: a face plate 2 facing outwards in normal use, a base plate 3 fixed with the face plate via an adhesive or in any other feasible manner, and stiffeners 4 at least partly located between the face plate 2 and the base plate 3.

As shown in FIG. 5, the left stiffener 4 and the right stiffener may have different cross-section shapes for connecting the face plate and the base plate 3, according to the actual conditions. Correspondingly, the shape of the face plate 2 may be varied adaptively with the configuration of the stiffeners 4. In this way, different assembling may be performed according to different needs.

The double-layer composite structure according to the fourth embodiment is identical to the one as described in the first embodiment in configuration, relative position and connection of respective components, width and thickness of stiffeners, and the like.

A difference of the fourth embodiment from the first embodiment is: whether the face plate 2 and the base plate 3 abut against each other or are spaced apart in a certain distance. In the first embodiment as shown in FIG. 2, it can be seen that there is a large gap between the main body portion 2c of the face plate 2 and the base plate 3 above the stiffeners 4, within which one or more reinforcement ribs extending laterally or in parallel with the longitudinal direction of the stiffeners 4 may be provided to further increase the strength of the composite structural board. In contrast, in the second through fourth embodiments, it can be seen that the main body portion 2c of the face plate 2 abuts against the outer periphery of the base plate 3, i.e., at the position where the base plate 3 and the stiffeners 4 are connected, there is no gap among the face plate, the base plate and the stiffeners.

Figure 11:
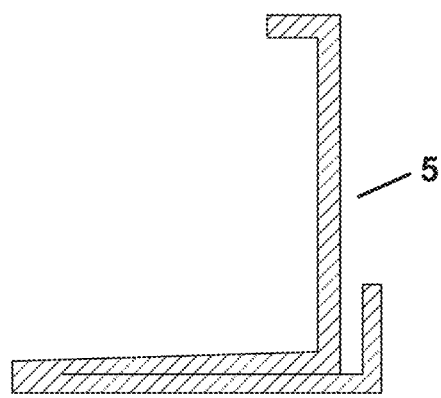
FIG. 11 is a sectional view of a stiffener in a fifth embodiment of a double-layer composite structural board according to the present disclosure.
Figure 12:
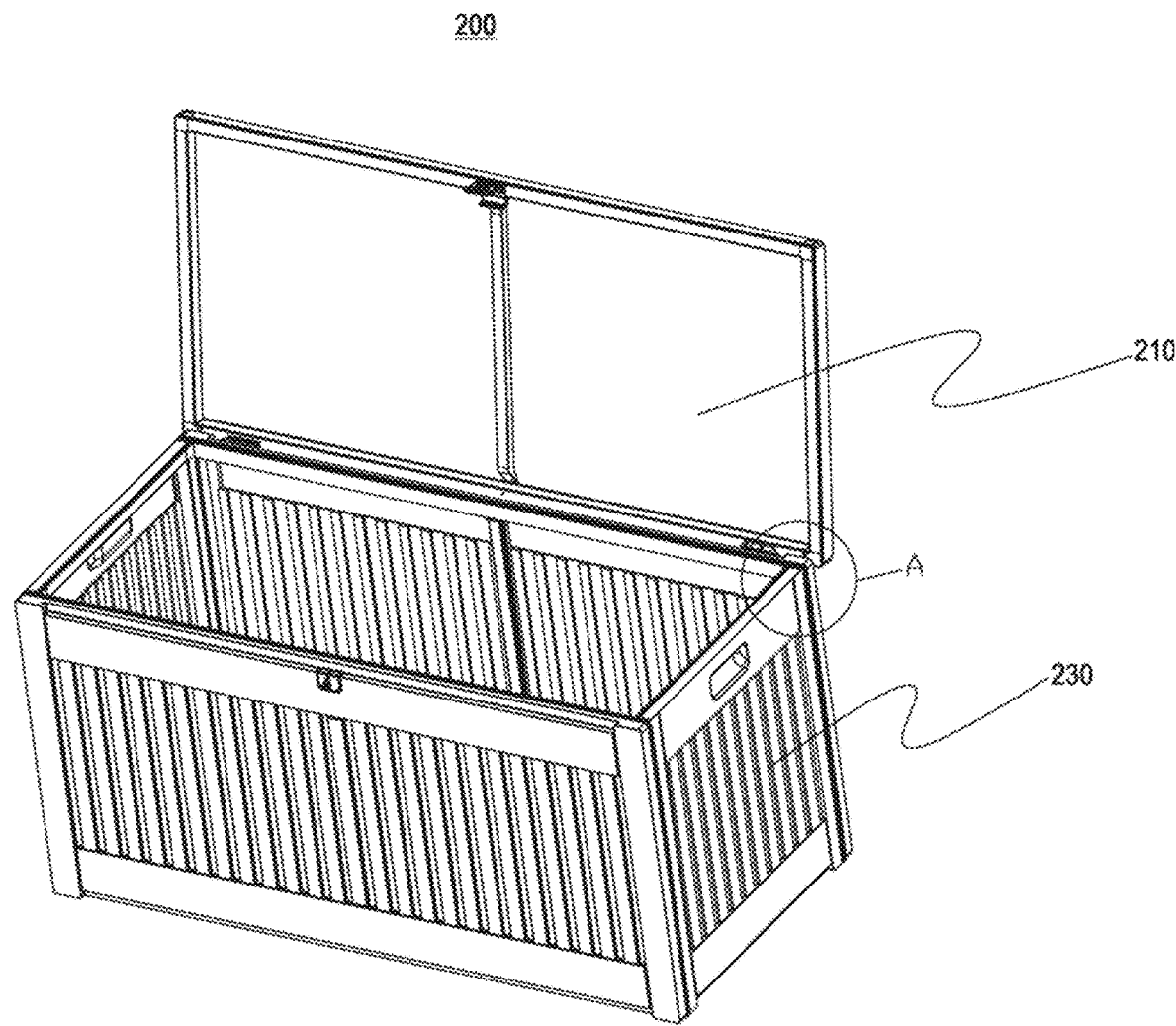
FIG. 12 is a perspective view of a box according to a preferred embodiment of the present disclosure, including a composite structural board according to the present disclosure.
Figure 13:
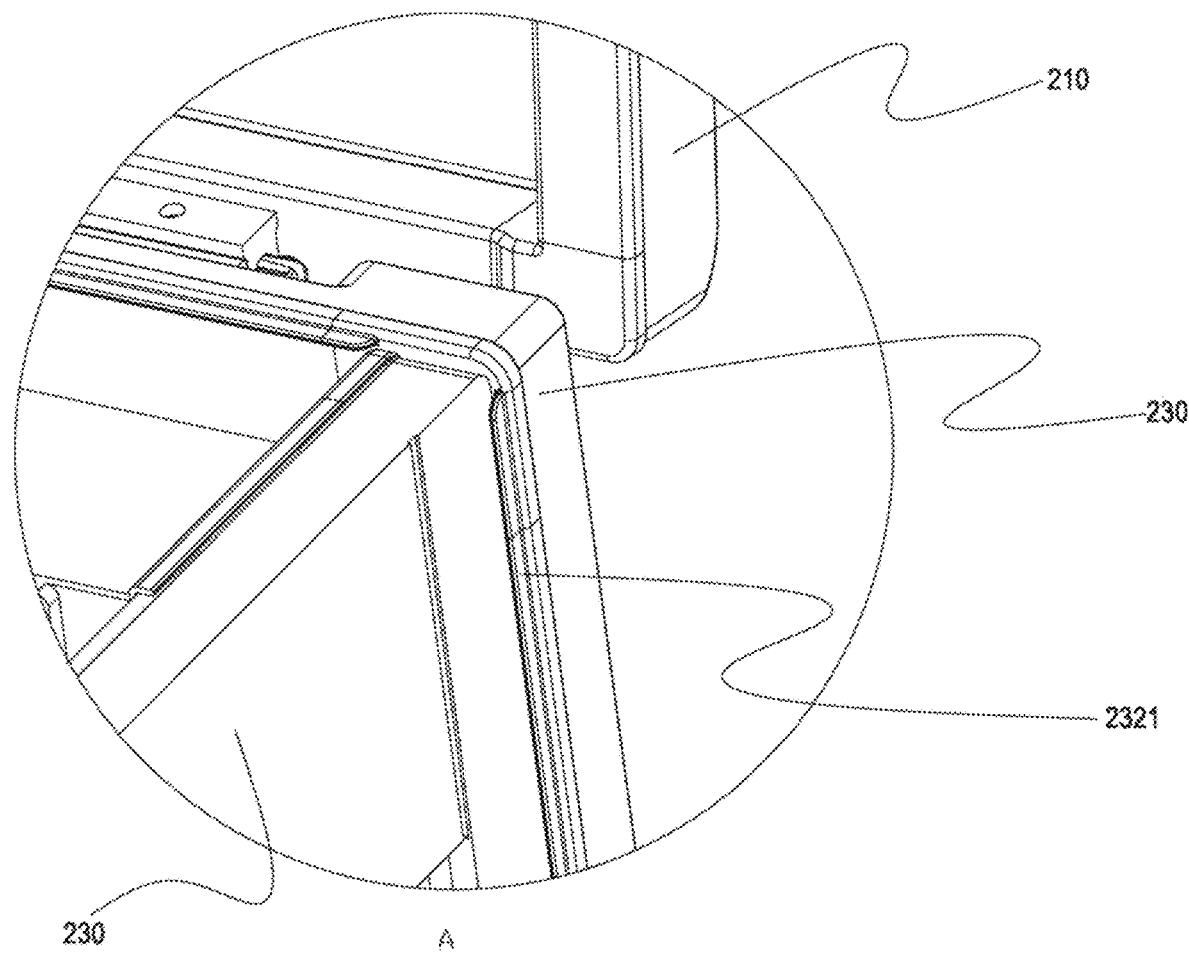
FIG. 13 is an enlarged view of the portion A in FIG. 12.
Figure 14:
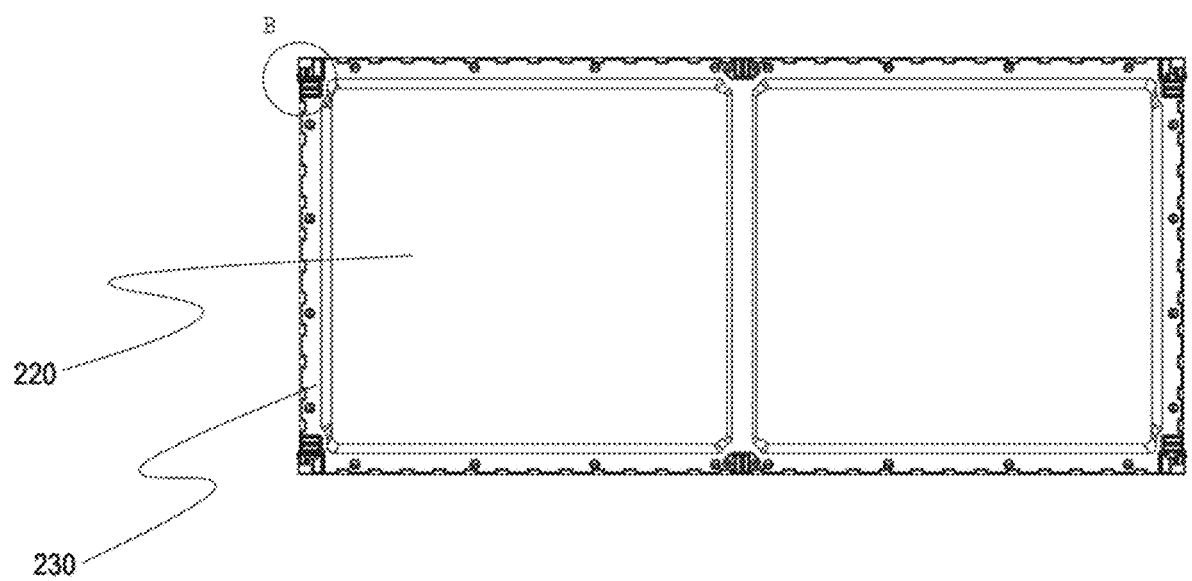
FIG. 14 is a sectional view of the box as shown in FIG. 12.
Figure 15:
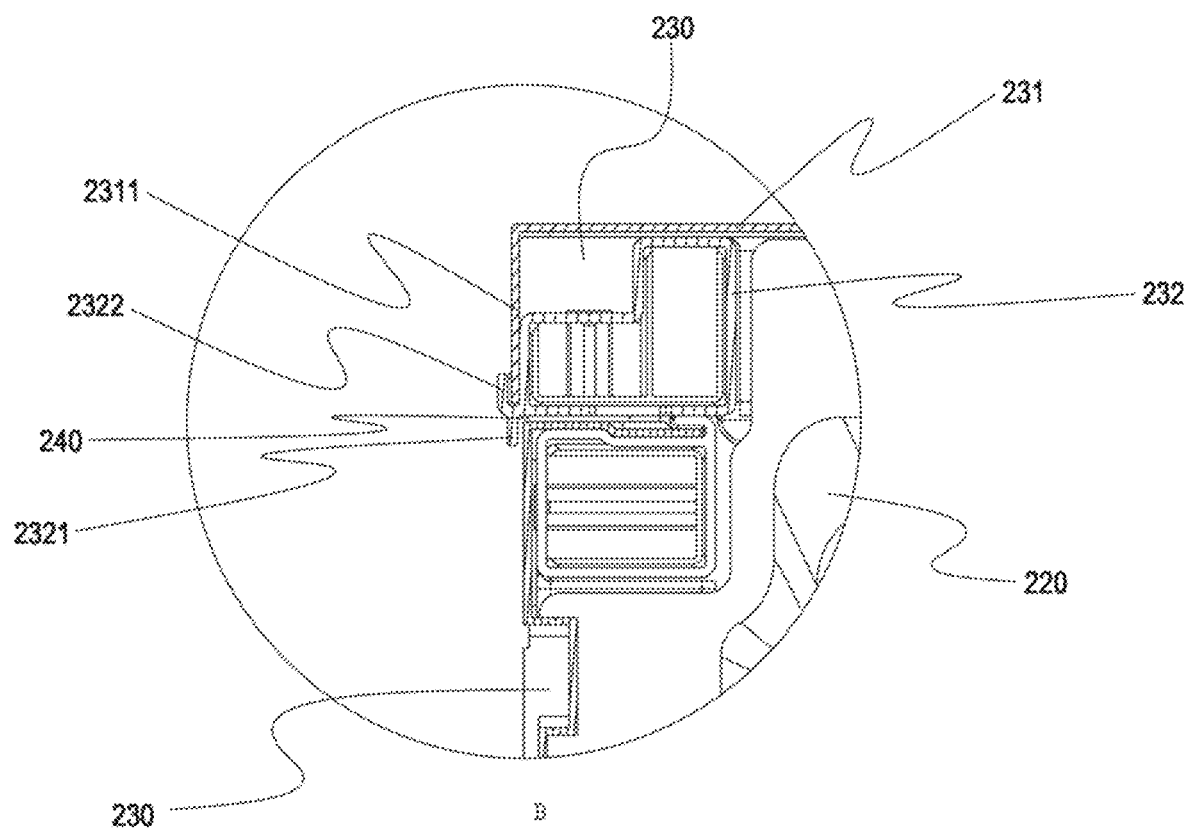
FIG. 15 is an enlarged view of the portion B in FIG. 14.
Figure 16:
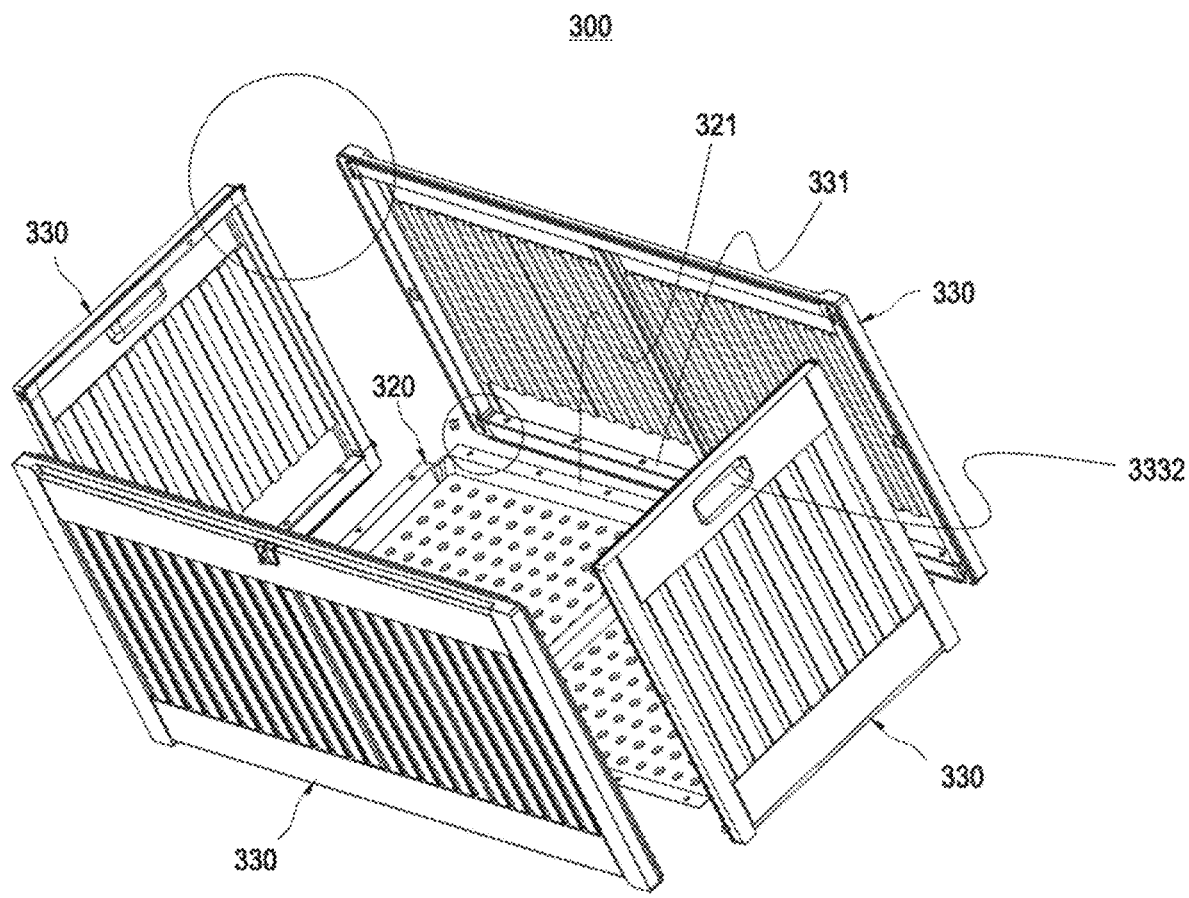
FIG. 16 is an exploded view of a box according to a preferred embodiment of the present disclosure, where a connection assembly for connecting with side panels and a floor panel are shown.
Figure 17:
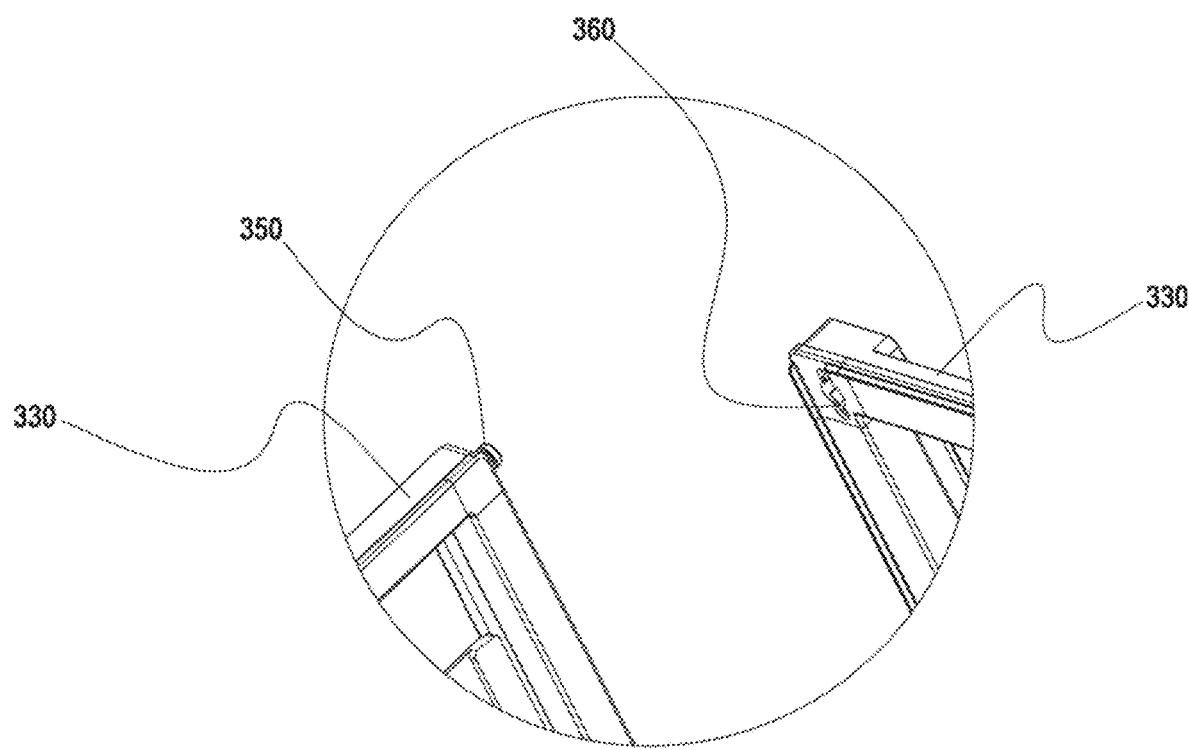
FIG. 17 is an enlarged view of the portion A in FIG. 16.
Figure 18:
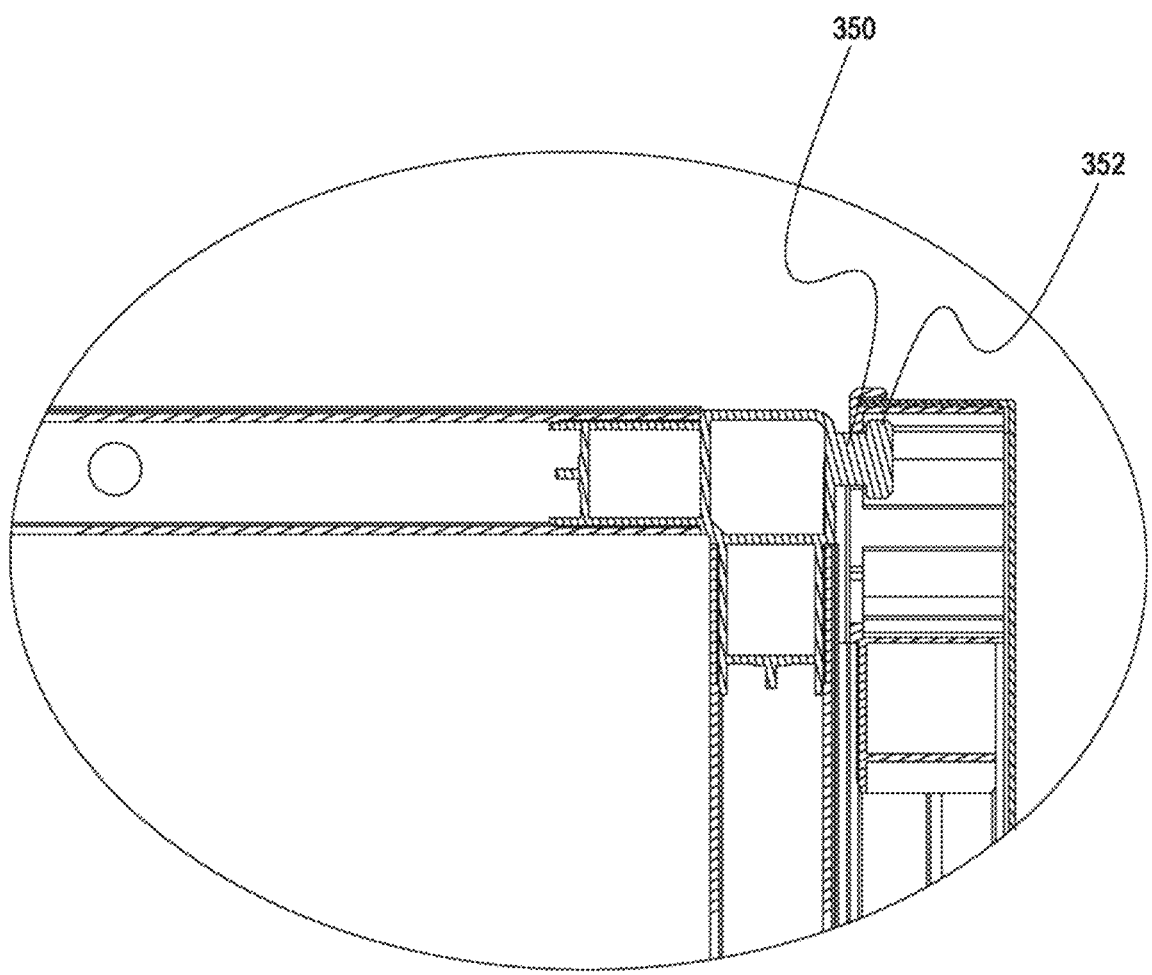
FIG. 18 schematically illustrate the connection between adjacent side panels of the box as shown in FIG. 16.
Figure 19:
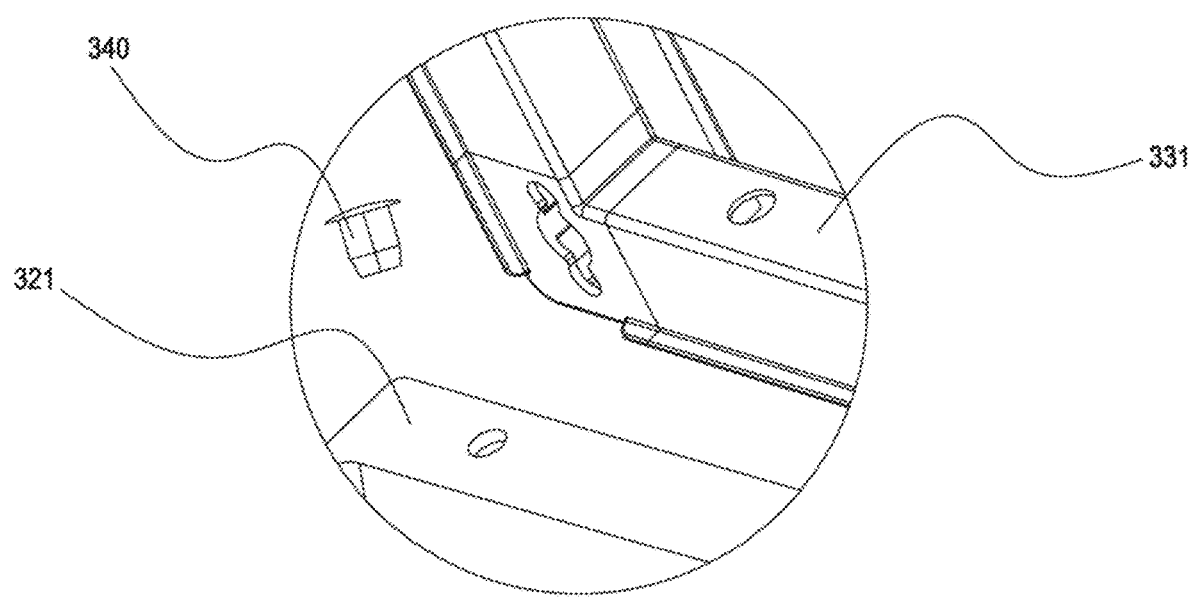
FIG. 19 is an enlarged view of the portion B in FIG. 16.
Figure 20:
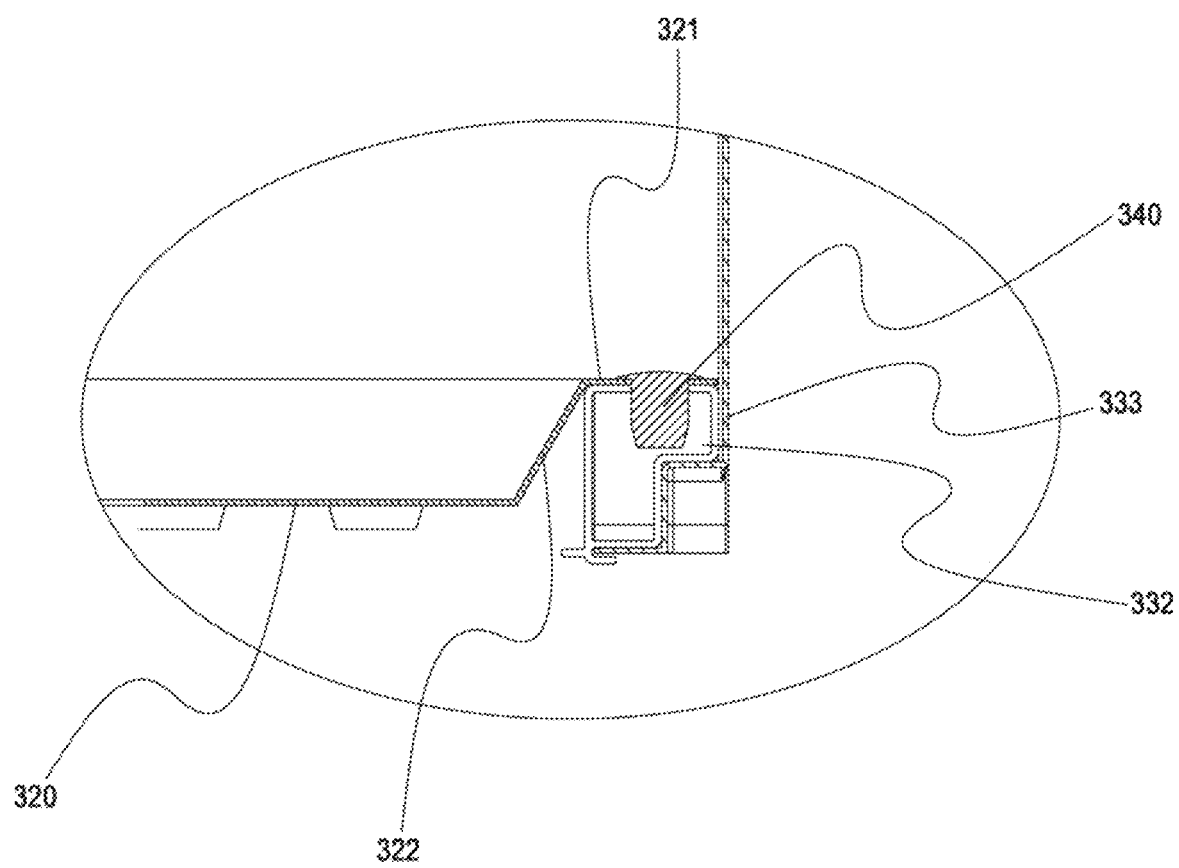
FIG. 20 schematically illustrate the connection between the floor panel and a side panel of the box as shown in FIG. 16.
Figure 21:
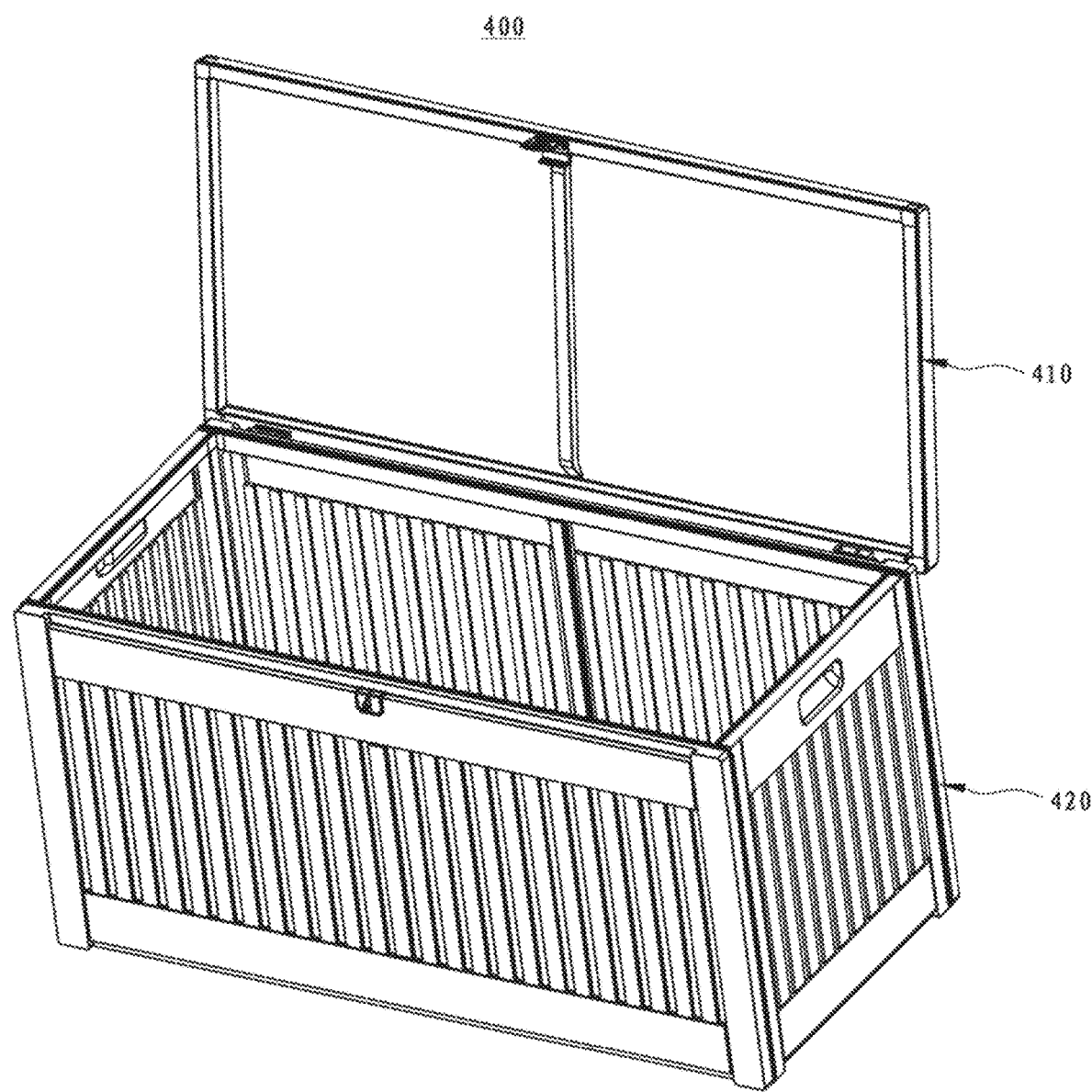
FIG. 21 is a perspective view of a box according to a preferred embodiment of the present disclosure, including a hinge assembly for pivotally connecting a box lid to a box body.
Figure 22:
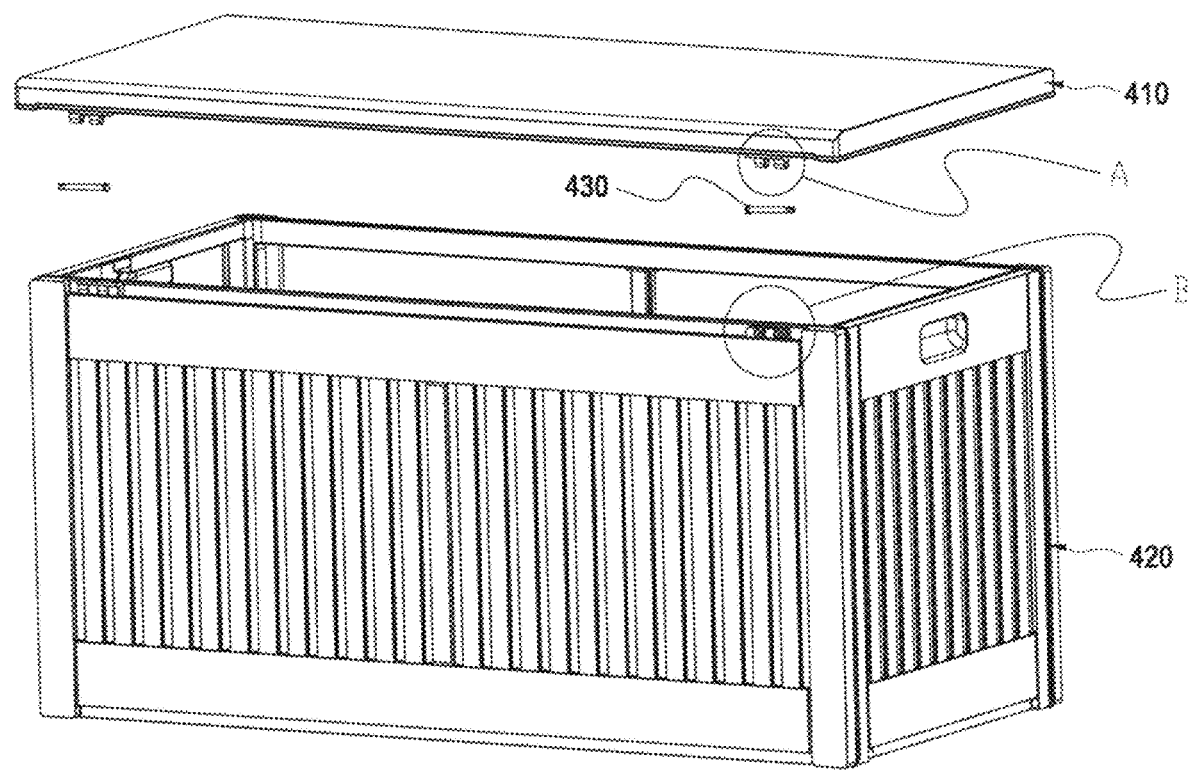
FIG. 22 is a perspective view of a hinge assembly when a box lid is separated from a box body.
Figure 23:
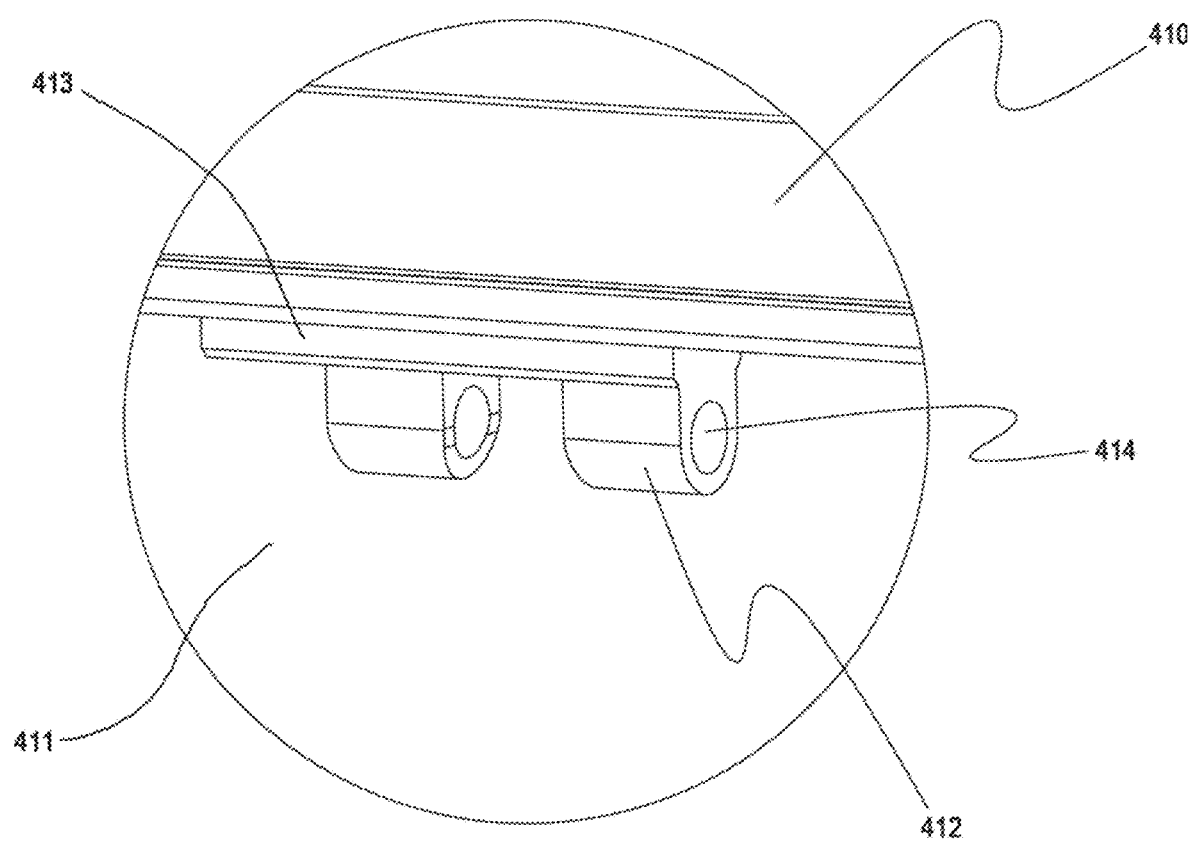
FIG. 23 is an enlarged view of the portion A in FIG. 22.
Figure 24:
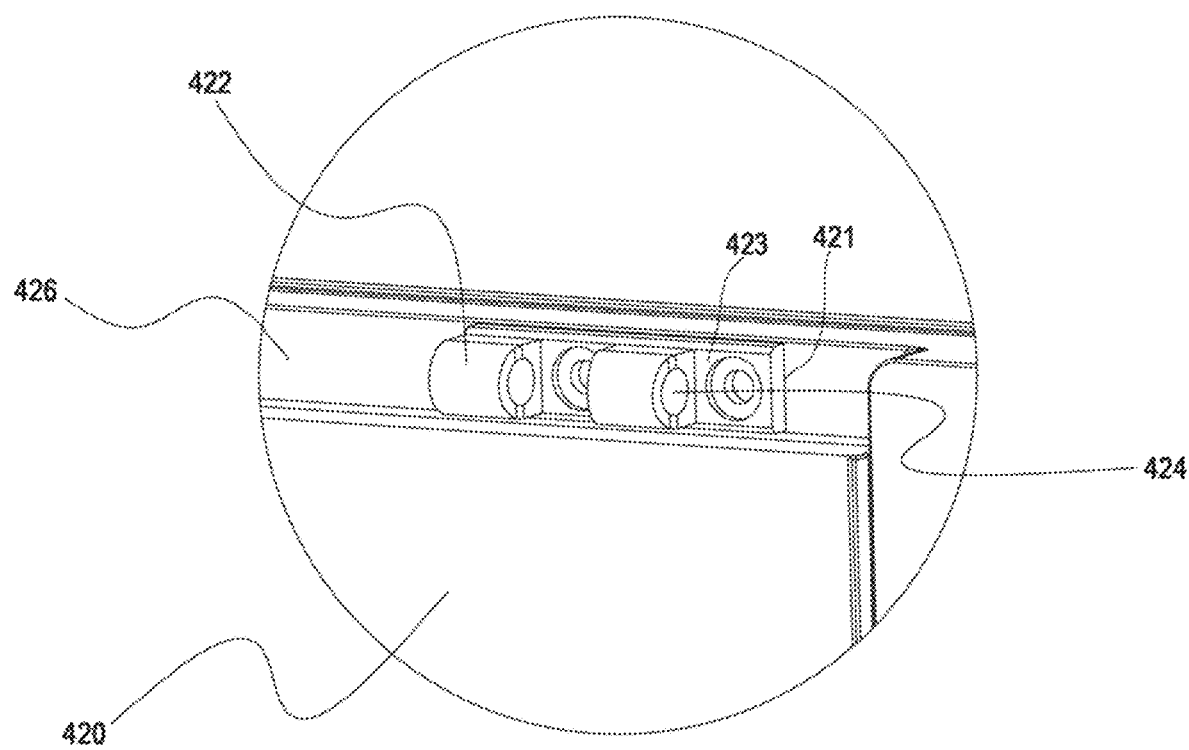
FIG. 24 is an enlarged view of the portion B in FIG. 22.
Figure 25:
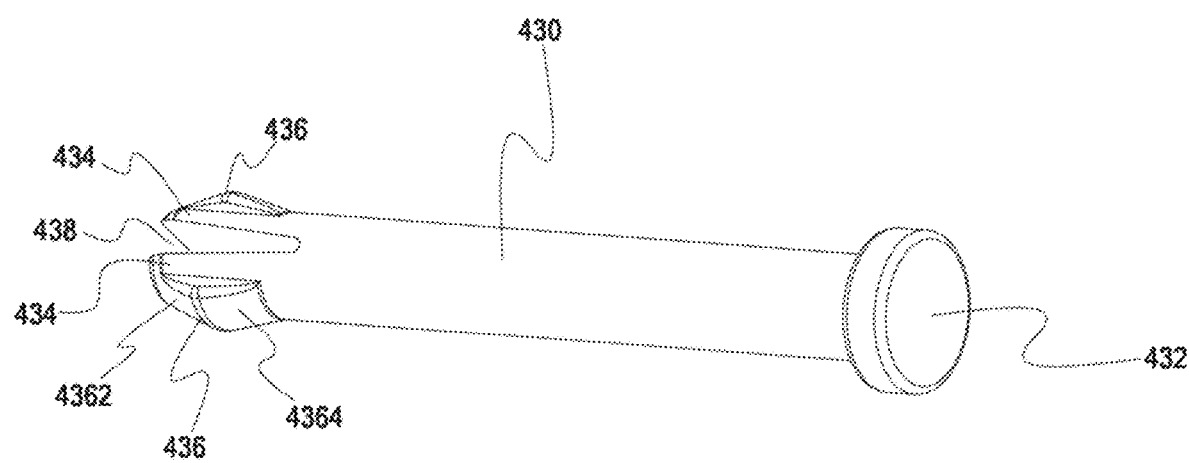
FIG. 25 is a perspective view of a pivot member.
Figure 26:
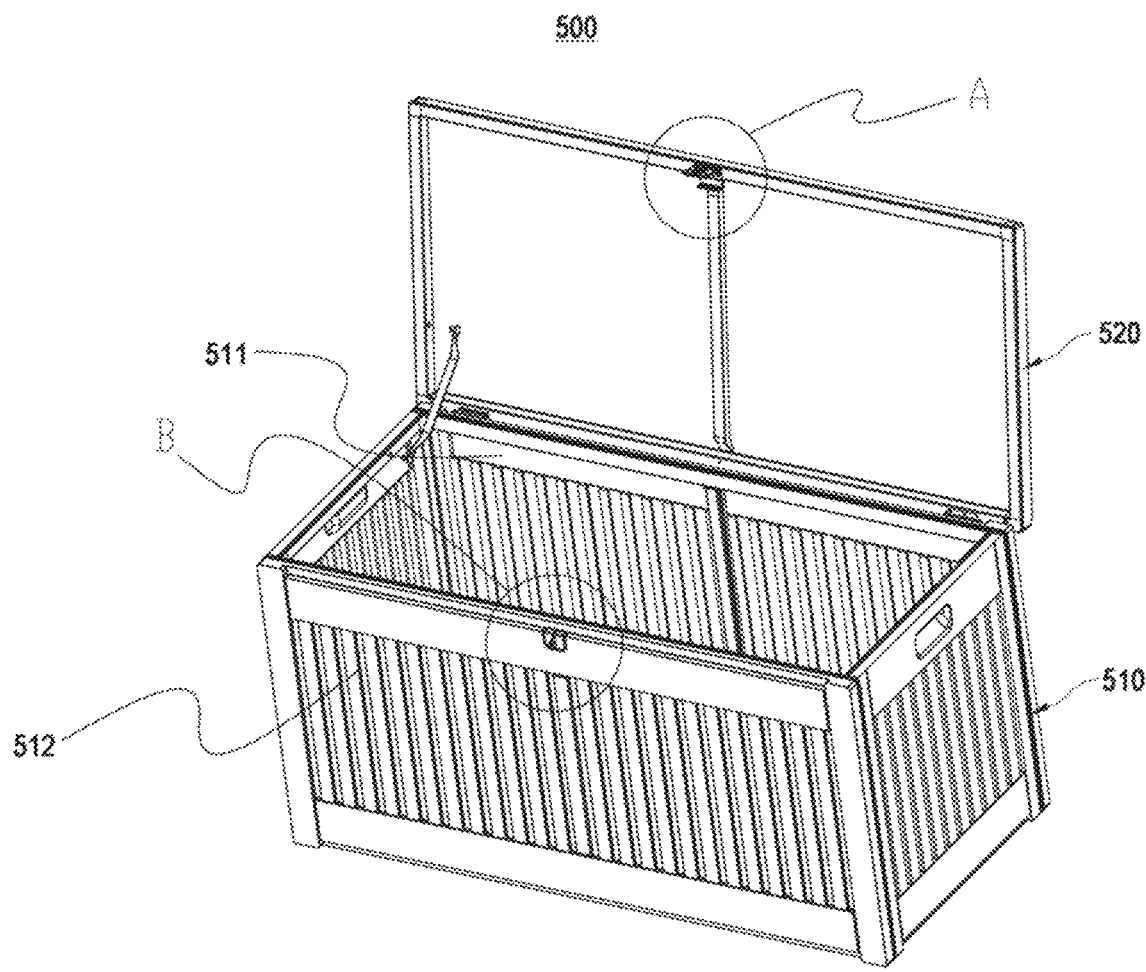
FIG. 26 is a perspective view of a box according to a preferred embodiment of the present disclosure, including a locking assembly configured to reinforce flexural strength of a front side panel of a box.
Figure 27:
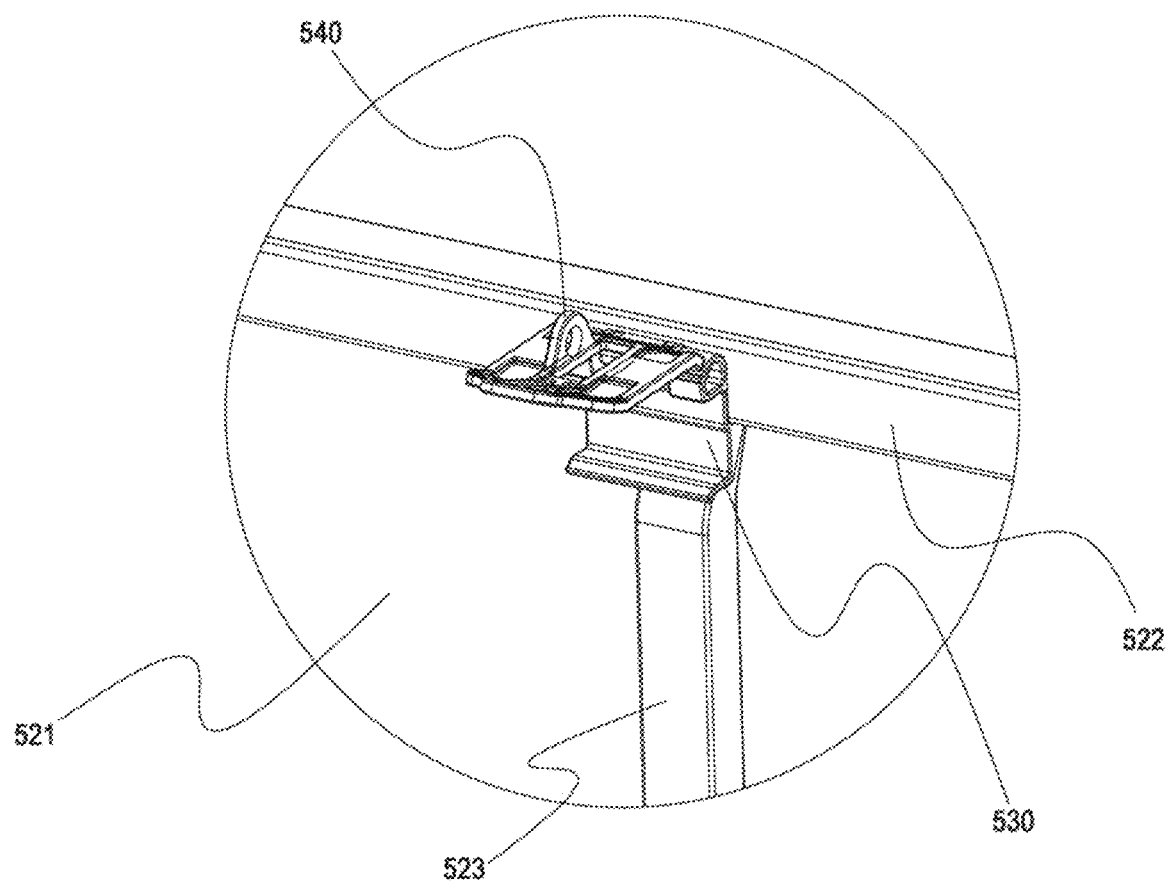
FIG. 27 is an enlarged view of the portion A in FIG. 26.
Figure 28:
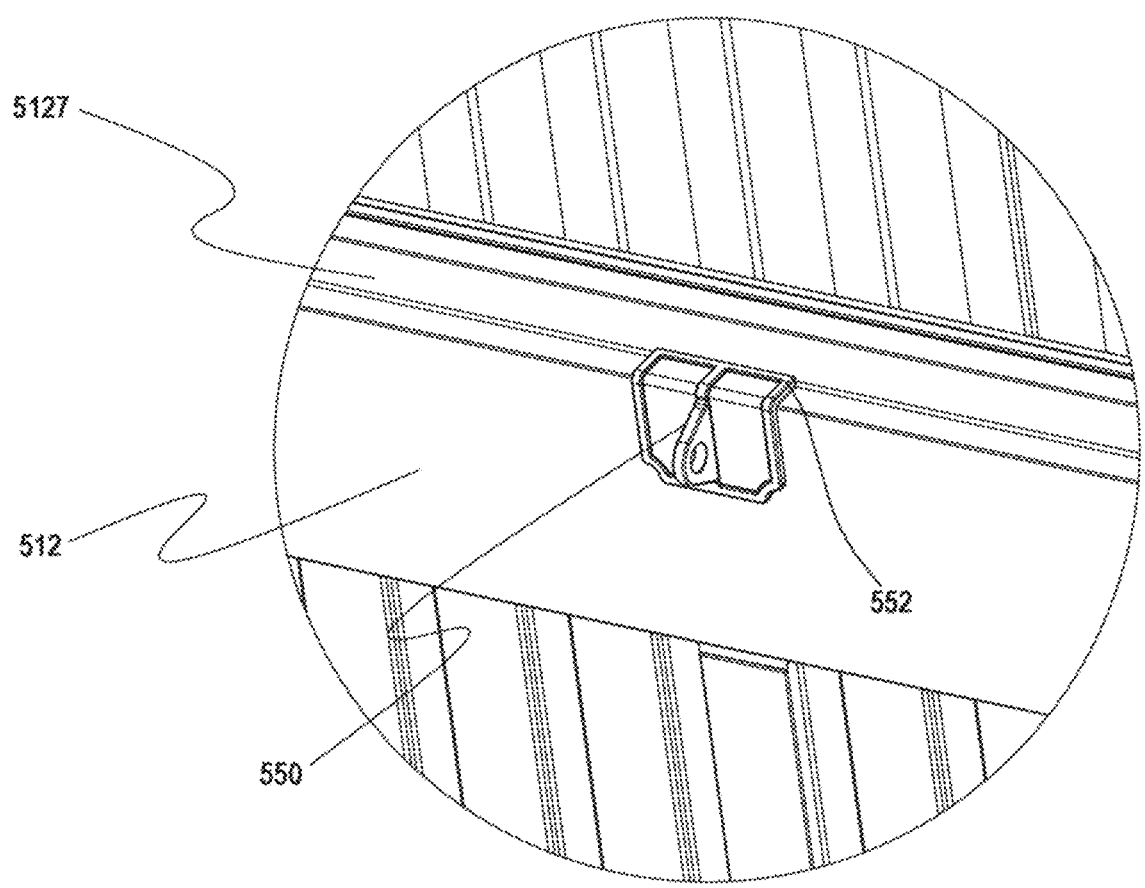
FIG. 28 is an enlarged view of the portion B in FIG. 26.
Figure 29:
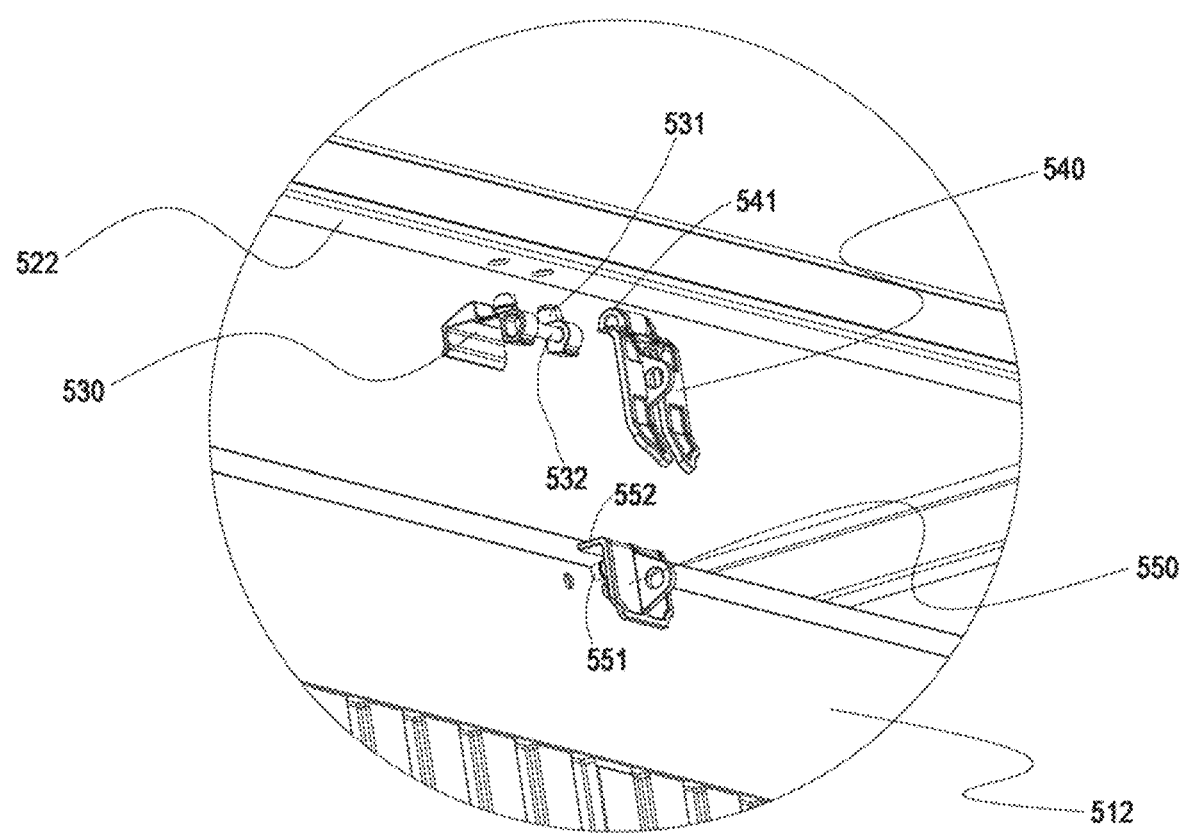
FIG. 29 is an exploded view of a locking assembly of the box as shown in FIG. 26.
Figure 30:
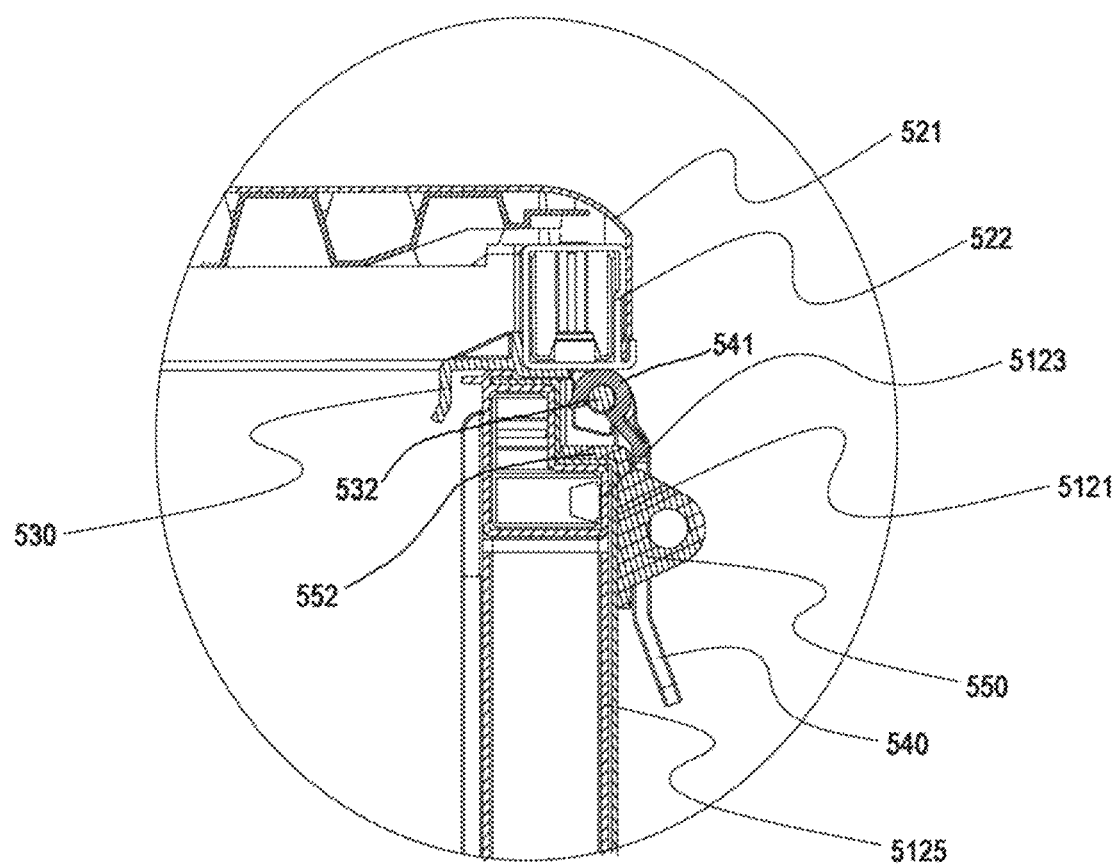
FIG. 30 is a sectional view of the box as shown in FIG. 26 with the box lid is closed on the box body.
Figure 31:
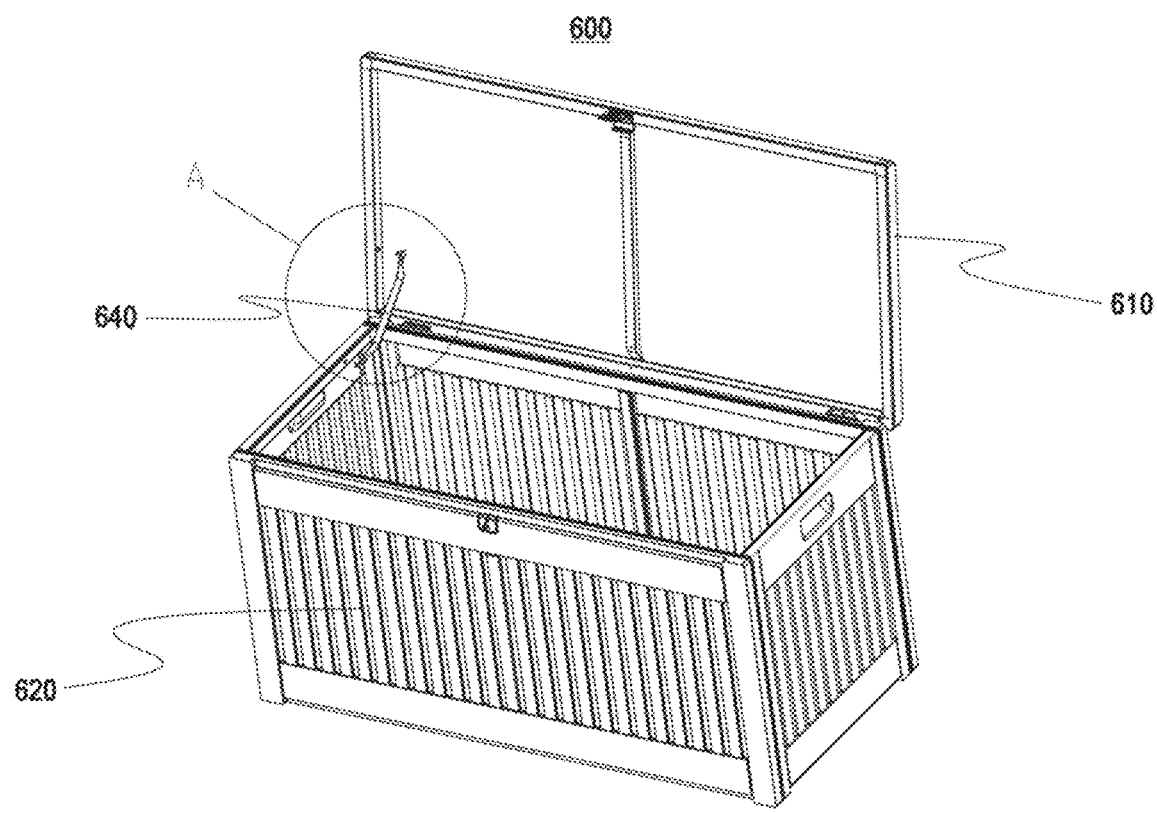
FIG. 31 is a perspective view of a box according to a preferred embodiment of the present disclosure, including a foldable limit member for limiting an open angle of a box lid.
Figure 32:
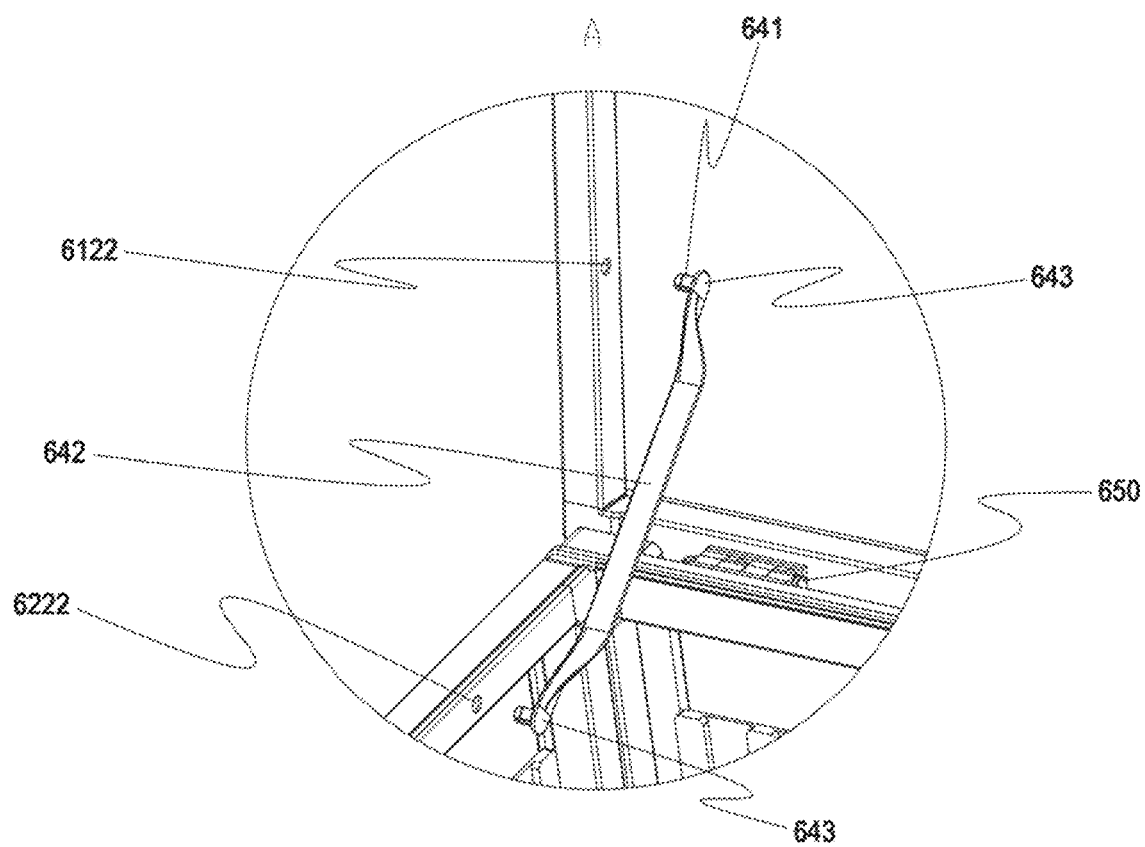
FIG. 32 is an enlarged view of the portion A in FIG. 31.
Figure 33:
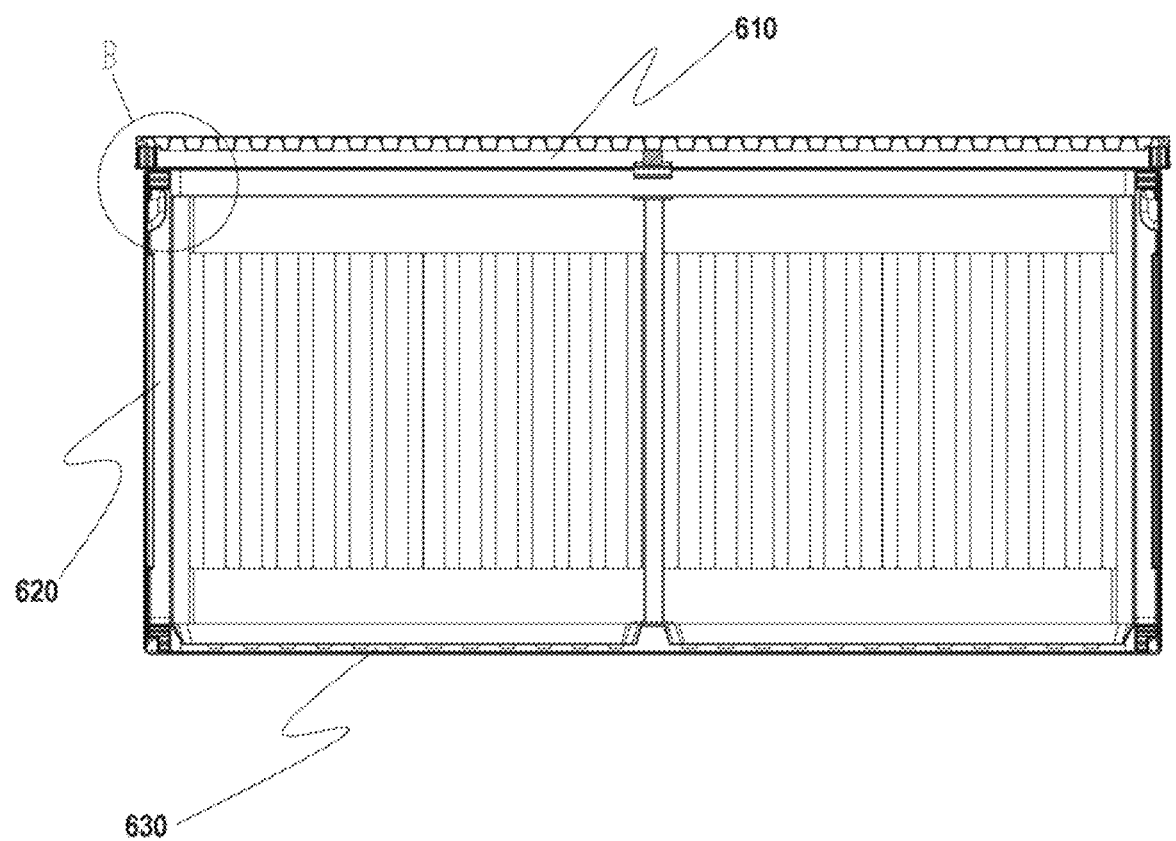
FIG. 33 is a sectional view of the box as shown in FIG. 31.
Figure 34:
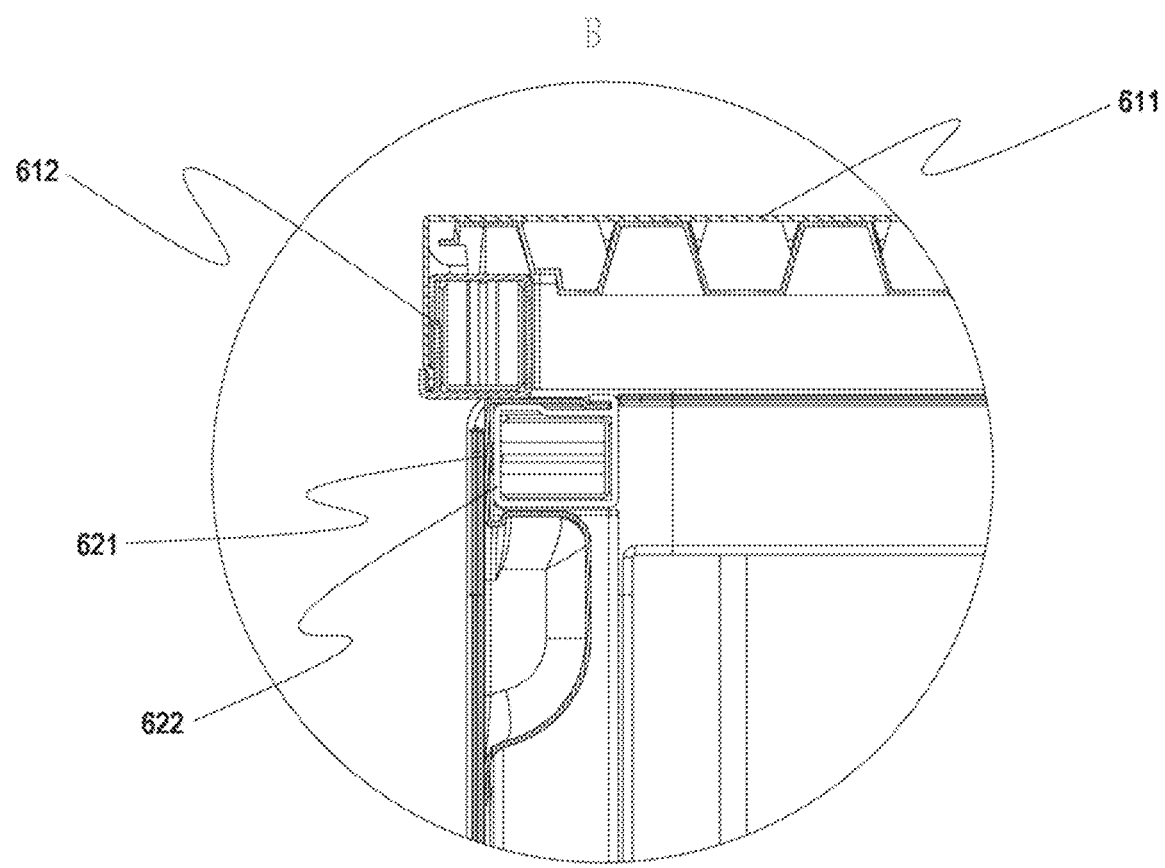
FIG. 34 is an enlarged view of the portion B in FIG. 33.
Figure 35:
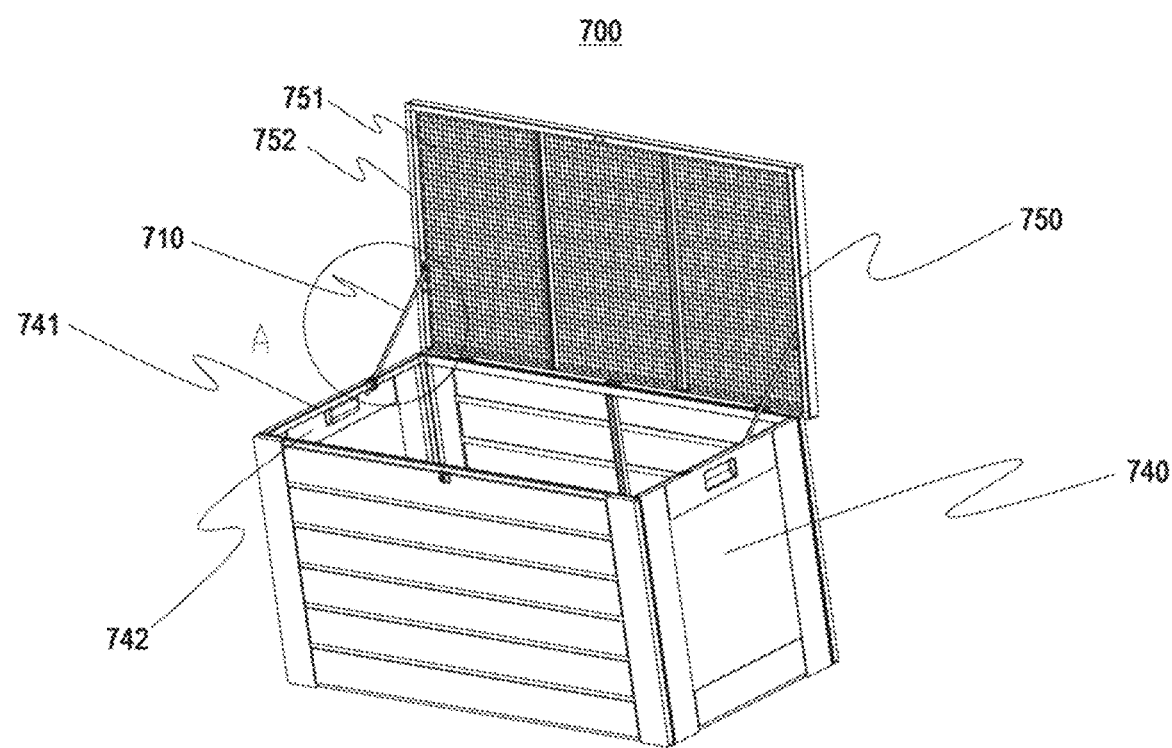
FIG. 35 is a perspective view of a box according to a preferred embodiment of the present disclosure, including a self-positioning assembly configured to position a box lid relative to a box body at any angle.
Figure 36:
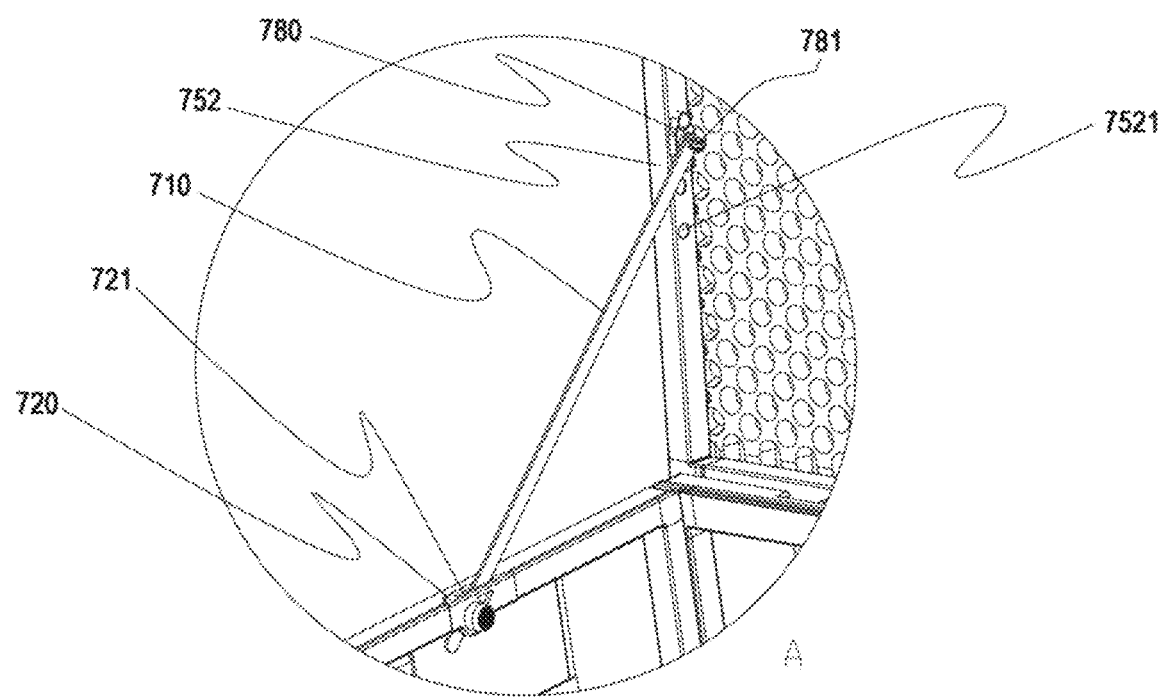
FIG. 36 is an enlarged view of the portion A in FIG. 35.
Figure 37:
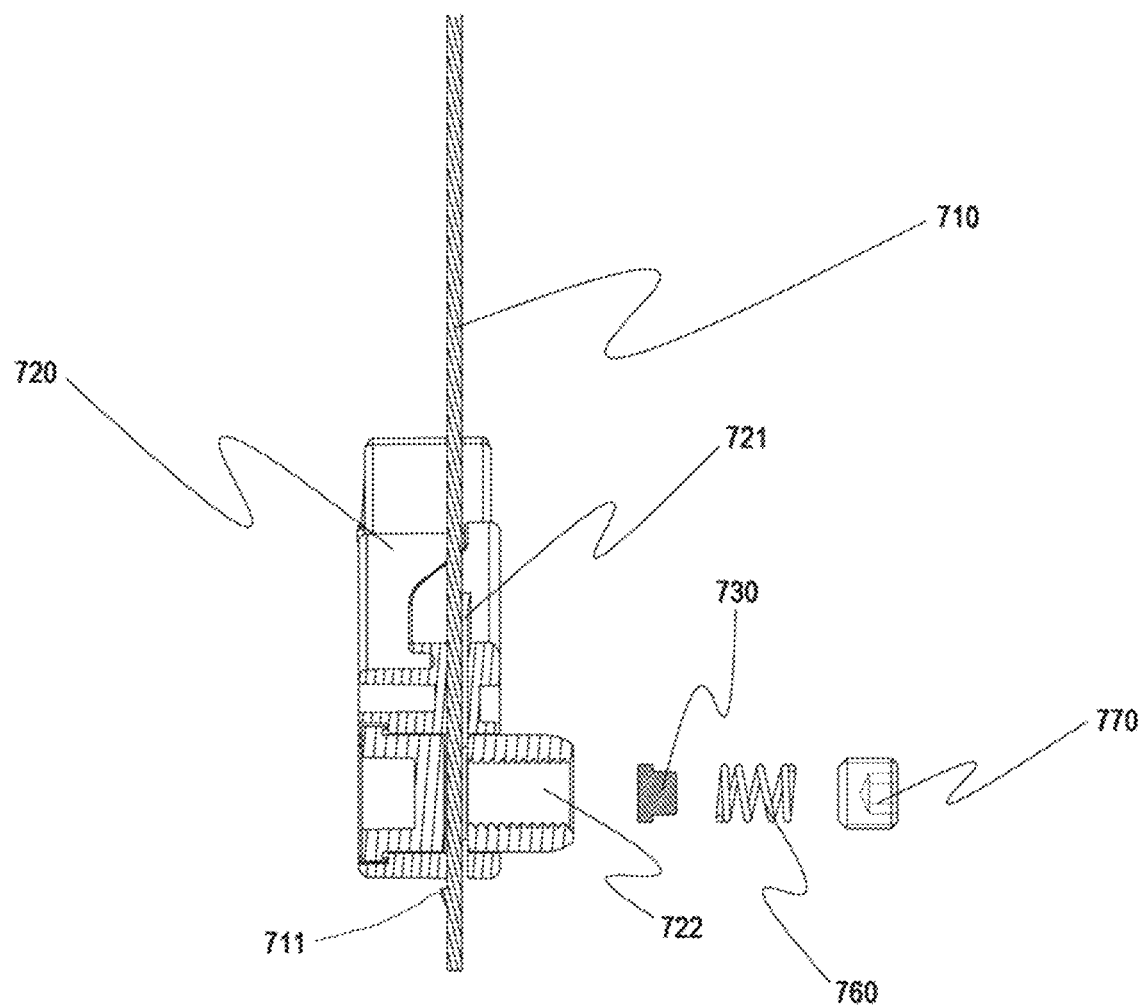
FIG. 37 is a sectional view of the self-positioning assembly as shown in FIG. 35 at a exploded state.
Figure 38:
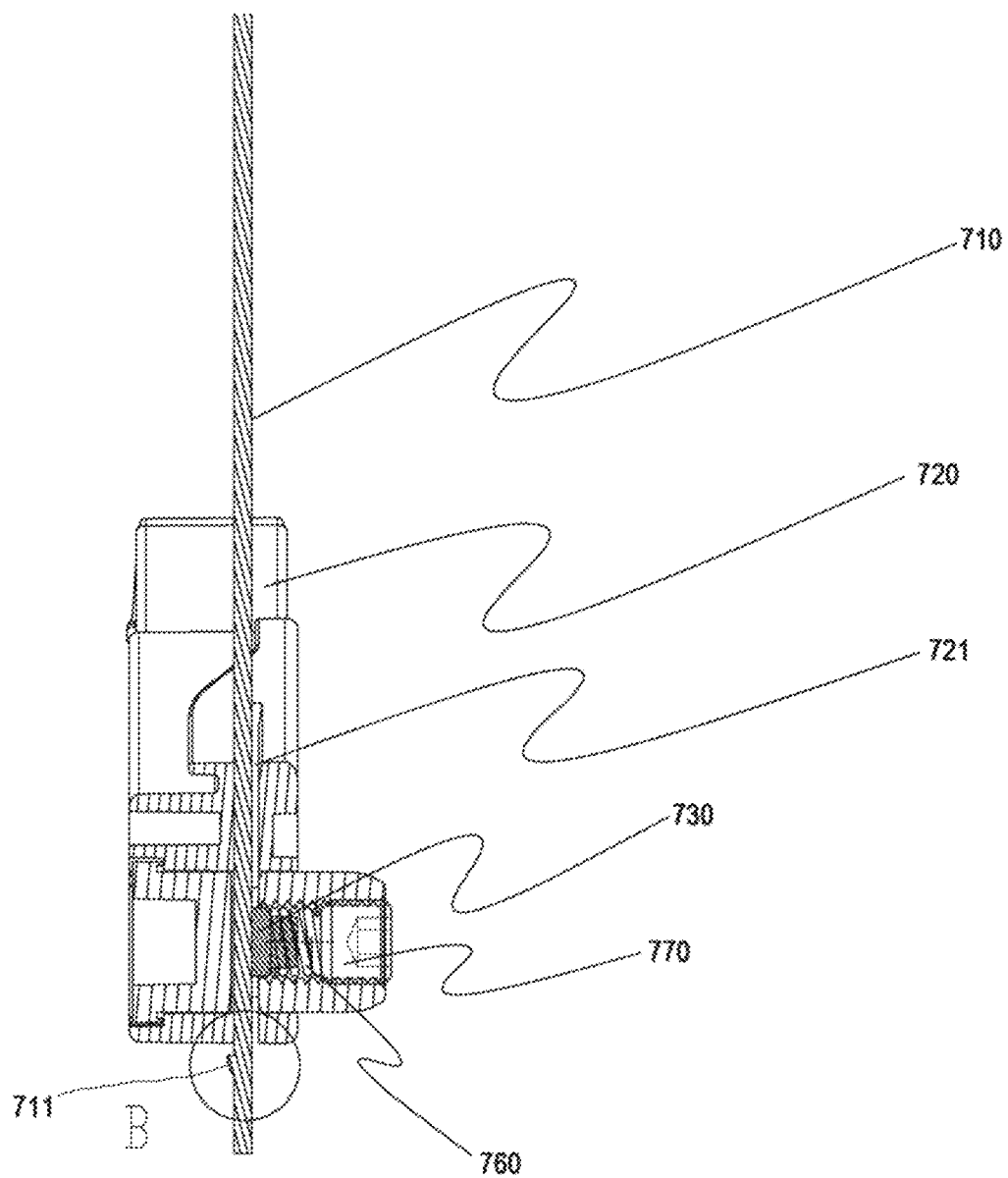
FIG. 38 is a sectional view of the self-positioning assembly as shown in FIG. 35 at an assembled state.
Figure 39:
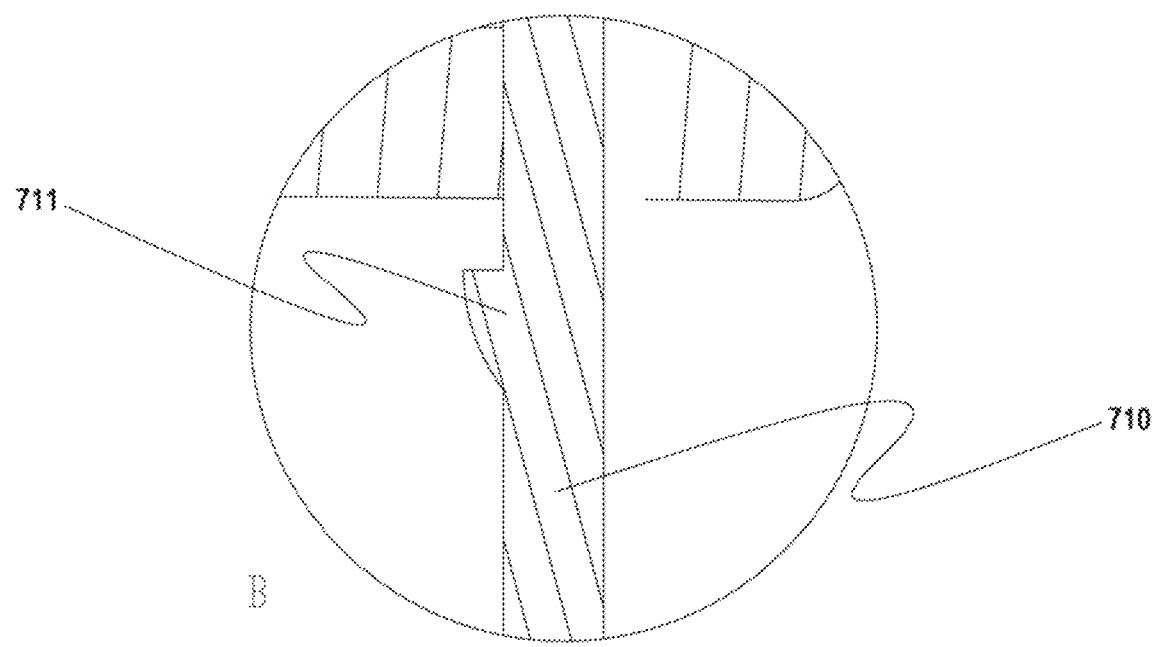
FIG. 39 is an enlarged view of the portion B in FIG. 38.

In addition, FIG. 11 illustrates a fifth embodiment. As shown, the cross-section of the stiffeners 4 is presented in a "double-L shape" structure. The two L shapes share a common vertical side 5. The vertical side 5 extends along a direction substantially perpendicular to the main body portion 2 until abutting against the lower surface of the face plate 2, and the vertical side extends against the inner surface of the peripheral portion 2a, which is located at the inner side of the peripheral portion 2a. A bottom side of the L-shaped structure located outside and extending laterally outwards is bent upwards around the lowermost end of the extension portion of the peripheral portion 2a, to wrap the bottom edge of the peripheral portion.

As a preferred embodiment, an end of the vertical side of the double-L shape structure in the fifth embodiment is bent horizontally inwards along a direction parallel to the main body portion 2c of the face plate 2 to abut against the edge of the base plate firmly.

The bottom edge of the L-shaped structure located outside of the double-L shape and extending laterally outwards wraps tightly at least part of the bottom edge of the peripheral portion 2a of the face plate 2, to further ensure a fixed connection therebetween. This can be accomplished by any existing process or with the aid of any existing tool. The wrapped region occupies, for example, a fifth, a quarter, a third, and the like, of the peripheral portion 2a of the face plate 2 in the vertical direction; and in the lateral direction (i.e., along the circumferential direction of the face plate 2), it may wrap the whole edge of the peripheral portion 2a of the face plate or wrap intermittently the peripheral portion 2a of the face plate.

In any of the aforementioned embodiments, the end of the flange 4a extending outwardly may be substantially flush with the outer surface of the extension portion of the peripheral portion 2a. Preferably, the flange 4a formed is slightly offset outwards relative to the extension portion of the peripheral portion 2a, such that the obtained composite structural board has a relatively gentle outer edge, to avoid scratching the user, clothes, or the like.

Likewise, in the fifth embodiment where the cross-section of the stiffeners 4 is a double-L shape structure, the lateral edge located outside the L shape wrapping the lower edge of the peripheral portion 2a is preferably gentle, or is preferably a rounded corner, to avoid scratching the user, clothes, or the like.

Figure 7A:
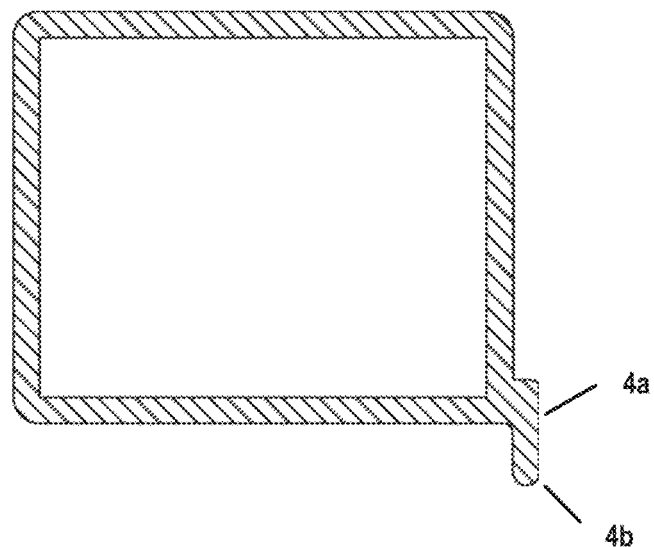
FIGS. 7A-7B are sectional views of a stiffener of a composite structural board according to a preferred embodiment of the present disclosure, in which a wing for blocking water is shown.
Figure 7B:
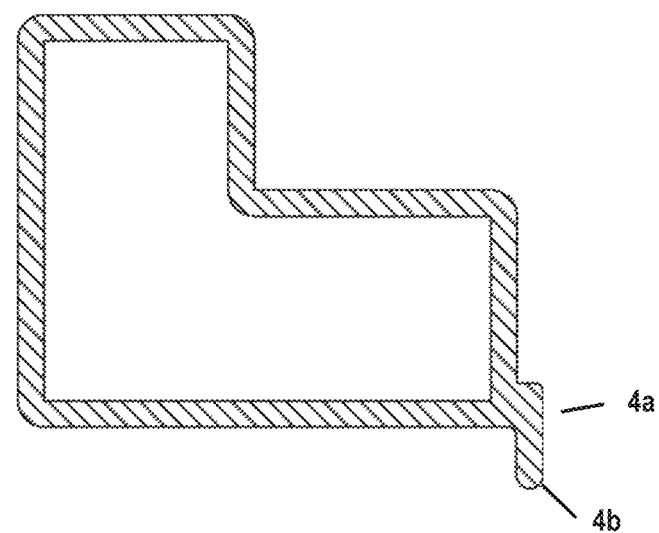

FIGS. 7A and 7B illustrate sectional view of a stiffener of the composite structural board according to the preferred embodiment of the present disclosure, where the flange 4a of the stiffener at its lower side may be provided with a wing 4b extending downwards therefrom.

Figure 8:
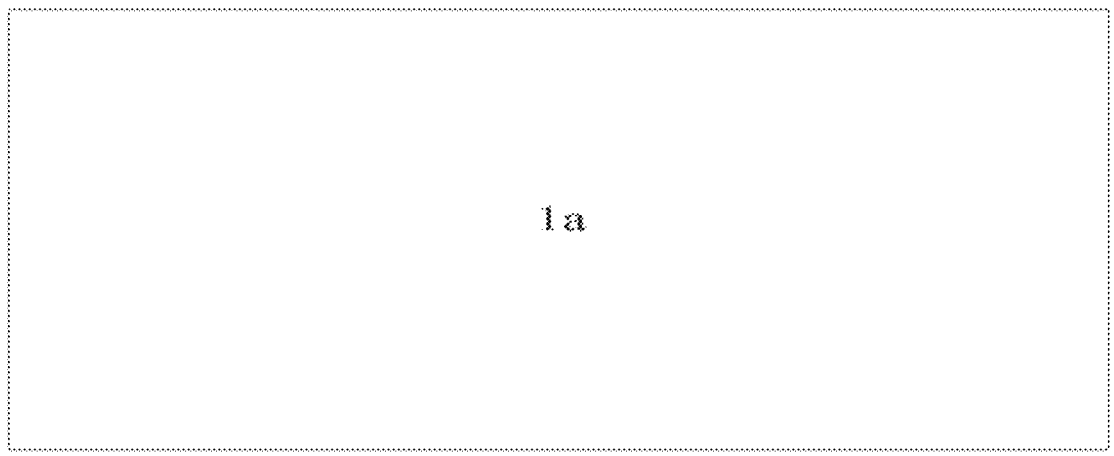
FIG. 8 schematically illustrates a top surface of a double-layer composite structural board according to the present disclosure.
Figure 9:
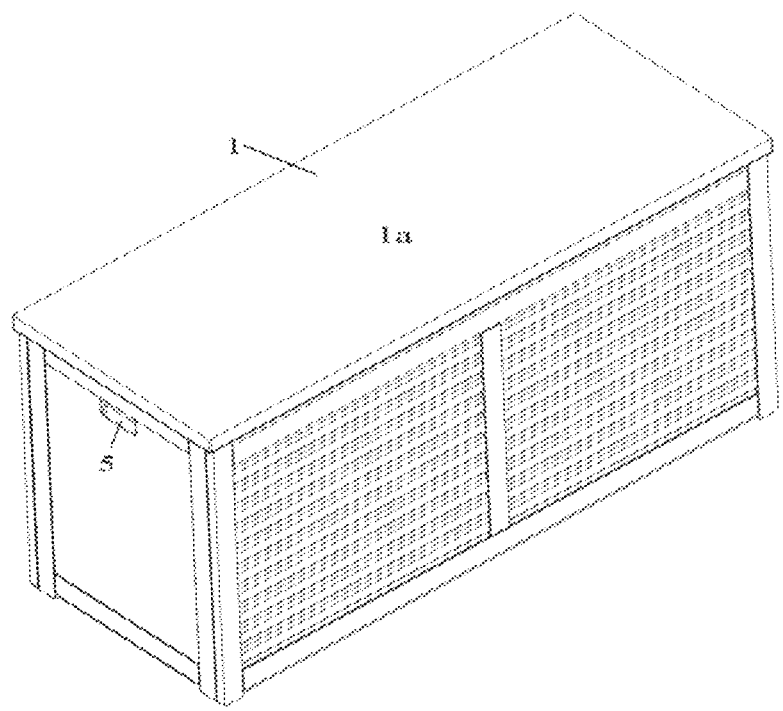
FIG. 9 is a schematically illustrates a cabinet assembled from double-layer composite structural boards according to the present disclosure.
Figure 10:
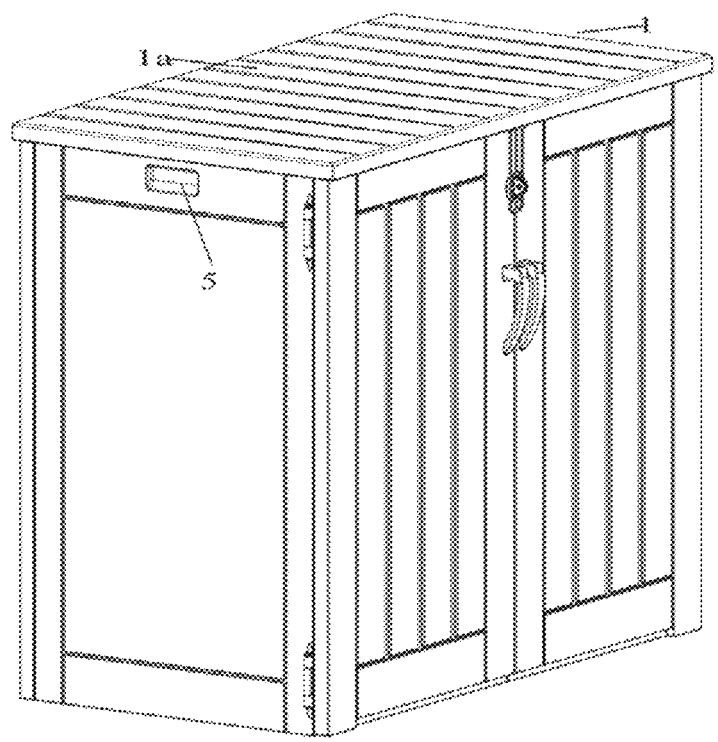
FIG. 10 is a schematically illustrates a further example cabinet assembled from double-layer composite structural boards according to the present disclosure.

FIG. 8 illustrates a top surface or outermost surface 1a of the face plate 2 of the double-layer composite structural board, which may be a flat, regular surface and used as a top surface 1a of a cabinet as shown in FIGS. 9 and 10. Preferably, the top surface 1a of the face plate formed of plastic may be attached with a veneer imitating a texture of natural wood or stone, such that the composite structural board bears a natural material-like appearance. The surface of the composite structural board may also include grooves formed by vacuum forming in various shapes, to obtain a more natural, beautiful appearance. In the circumstance, the complementary surface of the stiffener 4 may be molded with respective grooves to support the vacuum-formed plastic face plate and/or base plate when enhancing the strength of the composite structural board. Wherein, the stiffener 4 may be formed by stretching and then crimping or bending.

FIGS. 9 and 10 illustrate a cabinet assembled from the composite structural boards according to any embodiment of the present disclosure. The composite structural board 1 may be used in furniture, for example, as a top plate, base plate, side plate, and the like.

In various embodiments, the plastic face plate and/or base plate may be vacuum formed or injection molded, and the stiffener may be molded or stretch formed.

Features as described in one embodiment of the present disclosure are applicable to other embodiments. Of course, the composite structural board for a cabinet, as described above, may be applied to a table, a shelf, a backrest, a partition plate of a cabinet, a drawer, or other furniture components.

FIGS. 12-15 exemplarily illustrate a box 200 assembled from the composite structural board according to the present disclosure, including a box lid 210, a floor panel 220 and a plurality of side panels which are spliced together from end to end, where a seam 240 is formed between every two adjacent side panels 230. The side panel 230 includes a face plate 231 and a stiffener 232 connected with each other. The stiffener 232 is disposed along a peripheral edge of the face plate 231. In two side panels 230 adjacent end to end, the stiffener 232 of a side panel 230 is provided with a wing 2321 extending outwards, which has an elongated structure disposed vertically and covers the seam 240 between the two side panels 230 from the outside.

Preferably, the periphery of the face plate 231 is bent inwardly to form a bent portion 2311 around the stiffener 232 from the outside, and the stiffener 232 is provided thereon with a flange 2322 that presses against an edge of the bent portion 2311. The bent portion 2311 of the face plate 231 is pressed via the flange 2322 on the stiffener 232 such that the face plate 231 is fit with the stiffener 232 more closely, making the whole structure more compact and stable. The wing 2321 extends downwardly from the lower part of the flange 2322.

Preferably, the box includes four side panels 230 (i.e., a front, a rear, a left and a right panel) enclosed in a rectangular frame structure; the box lid 210 is hinged to the rectangular structure, which is used to cover an upper opening; and the floor panel 220 covers a lower opening of the rectangular frame structure. The front and rear side panels 230 clamp the left and right side panels 230, and stiffeners 232 of the front and rear side panels 230 are provided thereon with the wing 2321 as described above, i.e., the wing 2321 is provided at both sides of the stiffener 232 of the front and rear panels 230.

A box or cabinet including the composite structural board according to the present disclosure may further include the following members or components.

Connection Assembly

FIGS. 16-20 exemplarily illustrate a box 300 assembled from the composite structural boards according to the present disclosure. The box 300 is of a rectangular hexahedral structure and includes a box lid (not shown), a floor panel 320, and four side panels 330 (including a front, a rear, a left and a right side panel) which are formed of the composite structural boards according to the present disclosure. Two adjacent side panels 330 may be detachably engaged with each other. The bottoms of the side panels 330 are each provided with a support platform 331, and the peripheral portion of the floor panel 320 extends horizontally outwards to form positioning edges 321 placed on the respective support platforms 331 of the front, rear, left and right side panels. The box also includes a plurality of floor panel fixing posts 340 that are configured to snap fit into the side panels 330 such that the positioning edges 321 are pressed onto the support platforms 331. The side panels are removable relative to each other, and the floor panel 320 may be removed after removing the floor panel fixing posts 340, thereby enabling convenient assembling and removal.

Preferably, the box lid, the floor panel 320 and the side panels 330 of the box are all plastic boards, and even the floor fixing posts 340 are formed of plastic as well. The positioning edges 321 at the periphery of the floor panel 320 are provided thereon with fixing holes, and the supporting platforms 331 of the side panels 330 are provided thereon with mounting holes corresponding to the fixing holes. The floor panel fixing posts pass through the fixing holes and the mounting holes to be snap fit into the side panels such that the positioning edges of the floor panel are pressed against the support platforms of the side panels.

Preferably, two adjacent side panels are snap fit into each other via a limit post 350 and a limit hole 360 which are disposed at two adjacent side panels 330, respectively. The limit post 350 is disposed on a side panel, which has a thick head 352 at its free end. The limit hole 360 is arranged on the other side panel, which is flared from one end to the other end. The head 352 of the limit post 350 is inserted from the wide end to the narrow end of the limit hole 360.

Preferably, the right and left side panels 330 are clamped between the front and rear side panels 330, the right and left side panel at their sides are provided with the limit posts 350, and the front and rear side panels at their inner edge positions are provided with a limit holes 360 which are flared from top to bottom. During assembling, the limit posts 350 of the right and left side panels are inserted from the respective wide ends of the limit holes 360 of the front and rear side panels 330, and the front and rear side panels 330 move downward, as an effect of gravity, to cause the heads 352 of the limit posts 350 snap fit into the narrow ends of the respective limit holes 360, thereby assembling the right and left side panels and the front and rear side panels together.

Preferably, the side panel 330 includes a frame 332 disposed upright, and a panel 333 the periphery of which covers the frame 332. The upper surface of the bottom edge of the frame 332 forms the support platform 331 of the side panel. Preferably, the panel is a vacuum-formed plate, and it is provided with a frame 32 to reduce the thickness of the side panel when ensuring the strength thereof, thereby saving the material and making the box light-weighted. The floor panel 320 is directly snap fit with the upper surface of the frame bottom to implement a simple, solid structure. The limit posts and limit holes are all formed on the frame 332.

Preferably, the face panels 333 of the right and left side panels 330 are provided thereon symmetrically with inward grooves 3332, for convenience when carrying the box.

Preferably, the floor panel 320 is a vacuum-formed plate. Four sides of the floor panel 320 are all folded upwards to form ribs 332, and upper edges of the ribs 332 extend horizontally outwards to form the positioning edges 321. Preferably, the middle portion of the floor panel 320 is formed with a plurality of recesses arranged regularly, causing the support force of the floor panel stronger and the structure more stable.

Hinge Assembly

FIGS. 21-25 exemplarily illustrate a box 400 assembled from the composite structural boards according to the present disclosure, in particular including a hinge assembly pivotably connecting the box lid 410 and the box body 420. Preferably, the hinge assembly is formed of plastic, including a first hinge member 411, a second hinge member 421 and a pivot member 430. The first hinge member 411 and the second hinge member 421 are of the same shape and each include a fixing portion 413, 423 for engagement with and fixation to the box lid or box body, and one or more pivot portions 412, 422 extending perpendicularly from the fixing portions 413, 423, which are provided therein with through holes 414, 424 extending in parallel with the fixing portion for receiving pivotably a pivot member 430. When there are multiple pivot portions 412, 422, the pivot portions 412, 422 are spaced apart along the fixing portions 413, 423 and the space between the pivot portions 412, 422 is adapted to receive the respective pivot portion, and the through holes in the pivot portions are coaxial such that the first hinge member 411 and the second hinge member 421 can receive the pivot member 430 in a cooperating manner. Preferably, the first hinge member 411 is mounted fixedly onto a bottom of the rear stiffener of the box lid 410; the second hinge member 421 is mounted fixedly into a recess at the rear side of the top stiffener of the rear side panel of the box body 421. The first and second hinge members 411, 421 are located to align the through hole 414 with the through 424 for receiving the pivot member 430. The pivot member 430 is provided with a flange 432 at its proximal end, and one or more V-shaped cutouts 438 formed at its distal end extending from distal to proximal, such that the distal end of the pivot member 430 is provided with a plurality of resilient arms 434 bendable radially inwards extending from proximal to distal. As such, the pivot member 430 is formed as a one-piece structure which is resistant to crush and invulnerable when assembling and detaching the pivot member 430. Each resilient arm 434 at its radial outer surface is provided with a protruding portion 436 which is configured to pass through the though holes 414, 424 of the pivot portions when the resilient arm 434 is bent radically inwards, and not to pass through the through holes 414, 424 of the pivot portions when the resilient arm 434 is in a naturally stretched state. In the course of assembling, the flange 432 and the protrusion portion 436 fix cooperatively the first hinge member 411 located on the box lid and the second hinge member 421 located on the box body. In this way, the first hinge member 411 and the second hinge member 421 can be pivoted freely around the pivot member 430.

Preferably, there is one V-shaped cutout 438 and two resilient arms 434.

Preferably, an intersection of the resilient arms 434 is a smooth transition.

Preferably, the pivot member 430 is a one-piece plastic piece, and the protrusion portion 436 includes a distal guiding bevel 4362 and a proximal guiding bevel 4364, to enable convenient assembling and removal of the pivot member 430.

Preferably, the fixing portions 413, 423 are locked with the box lid and the box body, respectively, enabling convenient removal of the box lid and the box body if required.

Preferably, the fixing portion 413 on the box lid 410 is located at an edge at the rear side of the underside of the box lid 410. The fixing portion 423 on the box body 420 is located at the top of the rear side panel of the box body. Preferably, the top surface of the rear side panel at its outer edge is provided with a recess 426 which receives therein the fixing portion 423. Due to the recess 426, the underside of the box lid 410 can be fit with the top surface of the box body 420 when the box lid 410 is closed on the box body 420.

It would be appreciated that the pivotable connection structure between the box body and the box lid is not limited to the plastic material only, nor is it directed to a plastic box only.

Locking Assembly

FIGS. 26-30 exemplarily illustrate a box 500 assembled from the composite structural boards according to the present disclosure. The box 500 includes a box body 510 having a rectangular structure and assembled from a floor panel and four side panels (including a front, rear, left and right side panel), and a box lid 520 for covering the opening of the box body, where the box lid 520 at its rear end is hinged to an upper edge of the rear side panel 511 of the box body 510. The box body 500 also includes a locking assembly configured to reinforce the flexural strength of the front side panel 512 of the box 510, where the locking assembly includes: a first locking member 530 fixed to the front portion of the box lid; a second locking member 550 fixed to the front side panel of the box body; and a third locking member 540 that can be mounted pivotably to the first locking member 530.

Preferably, the first locking member 530 is inserted via snap-fit means at its top into the bottom of the front stiffener 522 of the box lid 520 to form an inverted U shape as a whole. When the box lid is closed, the top stiffener 5123 of the front side panel 512 of the box body can be received at least partly into a recess of the inverted U shape, thereby improving the flexural strength of the front side panel 512 of the box body.

Preferably, the first locking member 530 at its front is provided with a horizontal connecting rod 532, and the third locking member 540 at its top is provided with a hook 541 that can be hooked onto the connecting rod 532 and rotate around it in a certain range.

Preferably, the second locking member 550 is inserted via snap-fit means 551 disposed at its rear side into the front side of the top stiffener 5123 of the front side panel 512 of the box body. The top of the second locking member 550 is bent rearwards to form a horizontal bent portion 552 located in a step portion 5127 disposed at the top of the front side panel 512 of the box body. When the box lid is closed, the second locking member 550 and the third locking member 540 can be latched or locked together.

Preferably, the box lid 520 is provided therein with a stiffener rod 523 for reinforcing the strength of the box lid, which divides the box lid 520 into a left and a right portion.

Preferably, the front side panel 512 of the box body 510 is provided therein with a stiffener rod 5125 for improving the strength of the front panel, which is disposed upright to divide the front side panel 512 into a left and a right portion.

Preferably, the locking assembly is formed of plastic.

Foldable Limit Member

FIGS. 31-34 exemplarily illustrate a box 600 assembled from the composite structural boards according to the present disclosure, where a box lid 610 and a box body of the box are hinged together, and the box body is assembled from four side panels 620 and a floor panel 630. The box 600 further includes a foldable limit member 640 for limiting an open angle of the box lid 610 relative to the box body. The foldable limit member 640 is a bendable elongated rod-like member which is provided with a lateral protruding portion 641 at two ends, respectively. A first receiving hole 6122 is provided on a side stiffener 612 of the box lid 610 in a certain distance from the pivot portion 640 of the box body, and a second receiving hole 6222 is provided on a top stiffener 622 of the side panel 620 at the same side as the first receiving hole 6122 in a certain distance from a pivot portion 650 of the box body. The lateral protruding portions 641 at the two ends of the foldable limit member 640 are pivotably inserted into the first receiving hole 6122 and the second receiving hole 6222. After opening the box lid 610, the foldable limit member 640 is stretched straight, and connecting lines among three points formed by projecting the first receiving hole 6122, the second receiving hole 6222, and the pivot portion 650 onto a plane form an obtuse triangle. In other words, the length of the foldable limit member 640 enables the box lid 610 to flip more than 90 degrees but less than 180 degrees relative to the box body. In this way, after the box lid 610 is opened, the box lid 610 can be retained at the opened position due to its gravity and a pulling force of the foldable limit member.

Preferably, the foldable limit member 640 has a three-section structure, including a resilient body portion 642 in the middle having a flat strip shape suitable for bending, and connection ends 643 at two ends, which are flat ends. The resilient body portion 642 and the connection ends 643 are perpendicular to each other, two lateral protruding portions 641 are disposed at the two connection ends 643, respectively, and the lateral protruding portions 641 and the resilient body portion 642 are located at opposite lateral sides of the respective connection ends 634, i.e., the foldable limit member 640 is of a bow shape as a whole.

Preferably, the foldable limit member 640 is formed as one piece from PE or HDPE or PP.

Preferably, the foldable limit member 640 is located at the inner side of the box such that it is disposed inside the box when the box lid 610 is closed. In this way, the box has a neat appearance to prevent the foldable limit member 640 from hooking over other articles when carrying the box.

Self-Positioning Assembly

FIGS. 35-39 exemplarily illustrates a box 700 assembled from the composite structural boards according to the embodiments of the present disclosure, where a box lid 750 and a box body are hinged pivotably together, and the box body is assembled from side panels 740 and a floor panel. The box 700 includes a self-positioning assembly for arbitrarily fixing the box lid 750 in a certain angle range relative to the box body when opened, which includes:

a holder 720 fixed onto top stiffeners 742 of a left side panel 740 and/or a right side panel 740 of the box body, which is provided therein with a chute 721 extending along the vertical direction through the top and the bottom surfaces of the holder, and a retaining hole 722 extending horizontally to communicate with the chute 721 and through a side surface of the holder facing the inside of the box body;

a support rod 710 having an end hinged with a respective side stiffener 752 of the box lid 720 and an opposite end extending through the chute 721, where the width of the chute 721 is greater than that of the support rod 710, such that the support rod 710 can slide vertically and swing back and forth in the chute 721; and a fastening assembly disposed in the retaining hole 722 for applying a pressure to the support rod 710, where a frictional force against the support rod 710 caused by the pressure can overcome the gravity of the box lid 750 to thus hold the box lid at the opened position; when the frictional force is overcome, the support rod 710 may be slide vertically and swing back and forth in the chute 721; and the magnitude of the pressure can be adjusted by the fastening assembly.

Preferably, the retaining hole 722 at its inner surface is provided with an internal thread, and the fastening assembly includes:

a compression block 730 disposed in the retaining hole 722 and movable along the same;

a bolt 770 having an external thread configured to match with the internal thread of the retaining hole 722;

a resilient piece 760 disposed in the retaining hole 722 between the compression block 730 and the bolt 770 for applying a resilient force to the compression block 730. The bolt 770 may be screwed to adjust the pressure applied by the resilient piece 760 to the compression block 730, and in turn adjust the frictional force between the compression block 730 and the support rod 710.

Preferably, the resilient piece 760 is a compression spring, the compression block 730 is provided with a boss thereon, and the compression spring is nested at one end onto the boss and abuts at the other end against the end of the bolt.

Preferably, at the end passing through the chute 721, the support rod 710 is provided with a stopper 711 for preventing the support rod 710 from sliding out of the chute 721, and the stopper 711 is designed not to pass through the chute 721.

Preferably, the stopper 711 is a hook.

Preferably, the self-positioning assembly also includes a hinge base 780 which is connected onto the side stiffener 752 of the box lid 750, and the support rod 710 at an end is pivotably hinged to the hinge base 780.

Preferably, the hinge base 780 is provided with a positioning pin 781, and the side stiffener 752 of the box lid 750 is provided thereon with a plurality of positioning holes 7521 for receiving the positioning pin 781. The positioning pin 781 is plugged in one of the positioning holes 7521. Given that there is a plurality of positioning holes 7521, a maximum open angle of the box lid 750 may be preset by plugging the positioning pin 781 into a selected position hole 7521.

Preferably, the top stiffeners 742 of the left and/or right side panel 740 of the box body are provided thereon with a locking groove in which the holder 720 can be mounted.

Preferably, when the box lid 750 is closed, the self-positioning assembly is located in a receiving space formed by the box body and the box lid, to obtain a neater appearance of the box body and thus prevent the support rod 710 from hooking over other surrounding articles.

Preferably, the support rod 710, the holder 720 and the hinge base 780 are all formed of plastics.

Multiple embodiments have been provided and described above. Various modification and substitution can be implemented without departing from spirits and scope of the present disclosure. Therefore, the present disclosure is only limited by the appended claims and confined within its equivalent scope.

I claim:

1. A box having a box body including a front panel, a rear panel, a left side panel, a right side panel and a floor panel, wherein at least one of the panels comprises a composite structural board including:
    a face plate comprising a flat main body portion and a peripheral portion around the main body portion, perpendicular to the main body portion;
    a base plate having a plurality of protrusions, a lower surface of the face plate attached to and supported on a top surface of the protrusions;
    a stiffener adjoining the peripheral portion and the base plate;
    the stiffener having a closed shape cross-section; and
    a top surface of the stiffener abutting a bottom surface of the base plate, and the stiffener having a vertical surface connected to at least a part of the peripheral portion of the face plate.

2. The box of claim 1 further comprising:
    support platforms respectively formed by bottom stiffeners of the front panel, the rear panel, the left side panel and the right side panel;
    positioning edges respectively formed by a peripheral portion of the floor panel extending horizontally outwards and respectively located on the support platform of the respective side panels; and
    floor panel fixing members configured to pass through fixing holes formed in the positioning edges and corresponding mounting holes formed in the support platforms, to fix the positioning edges onto the support platforms.

3. The box of claim 2 wherein adjacent side panels are provided with a limit post and a limit hole, the limit post is configured to snap into the limit hole, so that the adjacent side panels are able to detachably connect with each other.

4. The box of claim 3 wherein the left side panel and the right side panel are located between the front panel and the rear panel, and the left side panel and the right side panel are provided with limit posts, and inner sides of the front panel and the rear panel are provided with limit holes flared from top to bottom at respective positions.

5. The box of claim 2 wherein a middle portion of the floor panel is recessed downwards relative to the positioning edges and includes a plurality of recessed portions arranged in a pattern.

6. The box of claim 1 further comprising a box lid openable from a top of the box body, wherein a rear portion of the box lid is pivotably connected to the rear panel of the box body via a detachable hinge assembly comprising:
- a first hinge member fixed to a bottom of a rear stiffener of the box lid;
- a second hinge member fixed into a recess formed at a rear of a top stiffener of the rear panel of the box body; and
- a pivot member pivotably connected the first hinge member to the second hinge member.

7. The box of claim 6 wherein the first hinge member and the second hinge member have the same shape, and both comprise a fixing portion engaged with and fixed to the box lid or the box body, and one or more pivot portions extending perpendicularly to the fixing portion, wherein the pivot portions have through holes parallel with the fixing portion for pivotably receiving a pivot.

8. The box of claim 7 wherein the pivot is provided at a proximal end with a flange having a size greater than the size of the through hole of the pivot portion, and the pivot at its distal end is provided with one or more cutouts extending from distal to proximal such that the distal end of the pivot forms a plurality of resilient arms capable of bending radially inwards, wherein a radial outer surface of each resilient arm has a protruding portion configured to pass through the through hole of the pivot portion when the resilient arm is bent, and not to pass the through hole of the pivot portion when the resilient arm is stretched.

9. The box of claim 8 wherein the protrusion portion has a distal guiding bevel and a proximal guiding bevel.

10. The box of claim 6 wherein the box lid and the box body are provided with a locking assembly comprising:
- a first locking member fixed to a front portion of the box lid;
- a second locking member fixed to the front panel of the box body; and
- a third locking member configured to be pivotably mounted to the first locking member.

11. The box of claim 10 wherein the first locking member is attached a bottom of a front stiffener of the box lid via snap-fit, the first locking member has a U-shape, and a top stiffener of the front panel of the box body is configured to be at least partially received in a recess of the first locking member when the box lid is closed.

12. The box of claim 10 further comprising a horizontal connecting rod at a front portion of the first locking member, a hook at a top of the third locking member, the hook adapted to hook onto and pivot around the horizontal connecting rod.

13. The box of claim 12 wherein the second locking member is plugged into the front of the top stiffener of the front panel of the box body via a snap-fit attachment, a top portion of the second locking member is bent rearwards to form a horizontal bent portion located at a step portion formed at the top of the front panel of the box body, and the second locking member and the third locking member are configured to be latched together when the box lid is closed.

14. The box of claim 6 further including a foldable limit member for limiting an open angle of the box lid relative to the box body, and wherein the foldable limit member is an elongated rod-like member including a first end pivotably fixed at a position on an inner side of a side stiffener of the box lid, a second end opposite the first end pivotably fixed at a position on an inner side of a top stiffener of the respective side panel of the box body spaced apart from the pivot portion of the box lid, and a bendable resilient body portion extending between the first end and the second end.

15. The box of claim 14 wherein a length of the foldable limit member is sized such that a maximum open angle of the box lid relative to the box body is greater than 90° and less than 180°, the body portion is a flat strip shape, and the first end and the second end are flat end portions perpendicular to the body portion.

16. The box of claim 6 further comprising a self-positioning assembly configured to hold the lid relative to the box body, the self-positioning assembly comprising:
- a holder fixed onto the top stiffeners of the left side panel and/or the right side panel of the box body, the holder having a chute extending along a vertical direction through a top and a bottom surfaces of the holder, and a retaining hole extending along a horizontal direction to communicate with the chute and pass through a side surface of the holder facing the inside of the box body;
- a support rod having a first end hinged to a respective side stiffener of the box lid and a second end extending through the chute, wherein the support rod is configured to slide and swing in the chute; and
- a fastening assembly disposed in the retaining hole for applying a pressure to the support rod, wherein the fastening assembly is configured to adjust the pressure.

17. The box of claim 16 wherein an inner surface of the retaining hole is provided with an internal thread, the fastening assembly comprising:
- a compression block disposed in the retaining hole and being movable along the retaining hole;
- a bolt having an external thread which is configured to match with the internal thread of the retaining hole; and
- a resilient piece disposed in the retaining hole between the compression block and the bolt, which is configured to apply a resilient force to the compression block.

18. The box of claim 17 wherein the resilient piece is a compression spring, the compression block is provided thereon with a boss, and the compression spring is nested at one end onto the boss and abuts at the other end against an end of the bolt.

19. A box comprising:
- a box body including a front panel, a rear panel, a left side panel, a right side panel and a floor panel, each of the panels comprising a plastic structural board including:
  - a face plate comprising a flat main body portion and a peripheral portion around the main body portion, perpendicular to the main body portion;
  - a base plate having a plurality of protrusions, a lower surface of the face plate attached to and supported on a top surface of the protrusions;
  - a stiffener adjoining the peripheral portion and the base plate;
  - the stiffener having a closed shape cross-section;
  - a top surface of the stiffener abutting a bottom surface of the base plate, and the stiffener having a vertical surface connected to at least a part of the peripheral portion of the face plate;

the stiffeners of the front panel, the rear panel, the left side panel and the right side panel providing support platforms;

the floor panel having positioning edges on top of the support platforms; and floor panel fixing posts extending through fixing holes in the positioning edges and through mounting holes in the support platforms, to attach the floor panel to the front panel, the rear panel, the left side panel and the right side panel.

* * * * *